United States Patent [19]

Aiken, Jr.

[11] Patent Number: 4,601,012

[45] Date of Patent: Jul. 15, 1986

[54] ZONE PARTITIONING IN VOLUME RECOVERY SYSTEM

[75] Inventor: John A. Aiken, Jr., Round Rock, Tex.

[73] Assignee: International Business Machines Corporation, Armonk, N.Y.

[21] Appl. No.: 586,597

[22] Filed: Mar. 6, 1984

[30] Foreign Application Priority Data

Mar. 11, 1983 [JP] Japan .................................. 58-39317

[51] Int. Cl.⁴ ................................................ G06F 1/00
[52] U.S. Cl. ..................................................... 364/900
[58] Field of Search ... 364/200 MS File, 900 MS File

[56] References Cited

U.S. PATENT DOCUMENTS

| 4,195,353 | 3/1980 | Abe et al. | 364/900 |
| 4,223,393 | 9/1980 | Abe et al. | 364/900 |
| 4,244,031 | 1/1981 | Izushima et al. | 364/900 |
| 4,330,217 | 5/1982 | Churgovich et al. | 364/900 X |

Primary Examiner—Raulfe B. Zache
Attorney, Agent, or Firm—J. F. Villella, Jr.

[57] ABSTRACT

In a word processing system storing a text stream on a direct access storage device (DASD) for recall and editing, the text stream is organized into a document, which is stored on the DASD as a data set. The data set consists of an index portion and a portion containing text records. The index portion is divided into nodes, of which the primary node is called the root node.

A volume which refers to the full contents of the DASD can be formatted to contain multiple zones, each of which is logically independent of all other zones, when the contents of a storage volume can be divided conceptually into portions the uses of which are logically independent. Each zone has its own media allocation map, and data sets whose root is allocated within a given zone have all allocations within that same zone. If more than one data set with a given data set type exists on the storage volume, all of those data sets and the data set director for that data set type are allocated within a single zone. For each zone, a recovery required indicator is provided so that zones not requiring recovery need not be scanned when volume recovery is being performed. When only one zone is being recovered, the logical sector number of the root node referenced by the index element in the anchor is used to determine whether or not the data set lies in the zone being recovered, and to skip data sets that do not lie in the zone.

11 Claims, 21 Drawing Figures

STORAGE ACCESS METHOD INTERNAL CONTROL BLOCK (UCS)

ZONE PARTITIONING IN VOLUME RECOVERY SYSTEM

DESCRIPTION

1. Technical Field

This invention relates to word processing systems and more particularly to improving the performance of the recovery of data stored on a Direct Access Storage Device (DASD) when the data may have been compromised through media errors or through system power failure during an update to the data set containing the data.

2. Background Art

Some current word processing systems use a very simple format for storing and locating documents on its diskette. There are always exactly 32 data sets ("jobs") available on a diskette. Allocation is by diskette track. The entire diskette index (the method of locating the data sets on the diskette) is small enough to be kept in memory at one time. The volume index is recorded redundantly on the diskette. The diskette index is copied to system memory when the diskette is inserted into the drive. Retrieving and searching the index thus does not pose a performance problem.

One of the main problems with this approach is the lack of flexibility with respect to the number of jobs or documents available on a single storage volume (diskette). In general, a word processing system needs to store a variable number of data sets on a diskette volume, and more than 32 data sets should be available for the system operator. This is especially true on word processing systems in which one of the storage volumes is a high-capacity internal hard disk.

Another problem with this approach is that space on the diskette is allocated to a particular data set on a track basis. Thus, the average wasted space on the diskette (allocated but not actually used to store data) is one-half track for each job that is actually in use, or a maximum of 16 tracks out of the 70 tracks available on a diskette.

Because of the very simple volume and data set index structure on these diskettes and the limited amount of data that can be stored on the volume, recovery performance is not generally considered a problem.

Other current word processing systems employ a 2-level diskette index, consisting of the diskette index which shows the location of data sets on the diskette, and one data set index for each existing data set. The former is fixed-sized; the size of the latter depends on the size of the data set. To locate a page of a document requires searching the data set index from the beginning to the appropriate points which show where the page is located on the diskette.

The problem with this approach is that it is very vulnerable to media errors in the index areas on the diskette. If a media sector containing the diskette index cannot be read successfully, all data sets accessed via that diskette index block, and all data sets accessed by subsequent diskette index blocks, are lost and no longer accessible to the operator. With respect to the data set index, a similar problem exists: if a data set index sector cannot be read from the diskette, that data set index block and all subsequent ones are lost, which means that all records accessed from such lost sectors are likewise lost to the operator.

Another problem with these two approaches is that error-free operation on certain physical sectors on the diskettes is essential for the use of the diskettes. This applies to cylinder 0 (the diskette track or tracks accessed with the read/record head in the home position), where certain information structured according to standard architectures is required to interpret the contents of the rest of the volume. In other words, if an error is detected on track 0 of a diskette, the diskette normally may not be used further.

Performance of recovery with these two approaches is also sometimes considered a problem. With a diskette which is nearly full of documents, recovery times of 60 minutes or more have been experienced. Considering the vulnerability of the volume indices to loss of data, the performance of the function may be considered inadequate.

Another approach in current use has the data set index distributed with the data in the working (non-permanent) storage. Each data block has a control area containing, among other information, the location of the prior and the next block. This means that sequential access is very fast, since the current record always defines the location of the next (and prior record).

The problem with this approach is that random access (going directly to records in the middle of the data set) is slow, since all prior records must be read. To fix the random-access performance would require another data set index set up for random access.

Recovery of such a data set would require sequential reading of all data set records. Considering the small amount of information obtained with each access, recovery of a large data set would take a long time, being mostly dependent on the access times of the DASD hardware device.

DISCLOSURE OF THE INVENTION

It is accordingly an object of the present invention to attempt to preserve the high data recovery rate while reducing the amount of data which must be considered in the recovery process.

It is another object of the present invention to provide a way to reserve space for any given purpose or set of data sets, and to ensure that this reserved space is not allocated to other purposes or data sets when space elsewhere on the volume is insufficient for the requirements of the other purposes or data sets.

These and other objects and advantages are achieved with the present invention. Briefly, a method and apparatus is disclosed for partitioning a storage volume into logically-independent portions called "zones". Access to information in existing data sets requires no change, and existing data sets may be accessed without regard to the number of zones on the volume or the particular zone in which the data set may reside. In creasing a data set, the desired zone in which the data set is to reside must be supplied for the first data set of that data set type. Thereafter, all other mechanisms for normal system operation are the same.

The advantages to be gathered during system recovery are possible as long as the following rules are observed for a zoned volume:

(1) A data set must reside entirely within a single zone. Data sets residing in logical sectors in two or more zones on a volume are not permitted.

(2) All data sets of the same data set type must reside in a single zone. This includes the data set directory which indexes the data sets of a particular type.

(3) Each volume zone has a separate media allocation map, and the media allocation map for a particular zone must be stored within the zone to which the map refers.

Within the word processing system, four areas are concerned with operations in support of this invention: storage media allocation, data set open and close, storage media formatting, and storage volume recovery. Storage media allocation is responsible for enforcing the first of the above rules, in that allocations are not allowed for data sets in any zone other than the one containing the root node. The data set open and close procedures must ensure that data sets of the same type remain in the same zone.(Open Create Data Set), and they provide for indications of recovery required on a zone basis. Storage media formatting provides the mechanisms whereby the volume can be partitioned into zones. Finally, recover volume must recognize the existence of zones and must recover each zone as though it were an independent volume.

BRIEF DESCRIPTION OF THE DRAWING

FIG. 5A shows the unit control block for storage (UCS). FIGS. 5B and 5C provide more detail on the media allocation map buffer area of the UCS.

FIGS. 8A-C are flow diagrams showing the operational steps of the present invention with respect to Open data set and Close data set, specifically the portion of these functions concerned with data set placement and recovery required indicators.

BEST MODE FOR CARRYING OUT THE INVENTION

Figure 1:
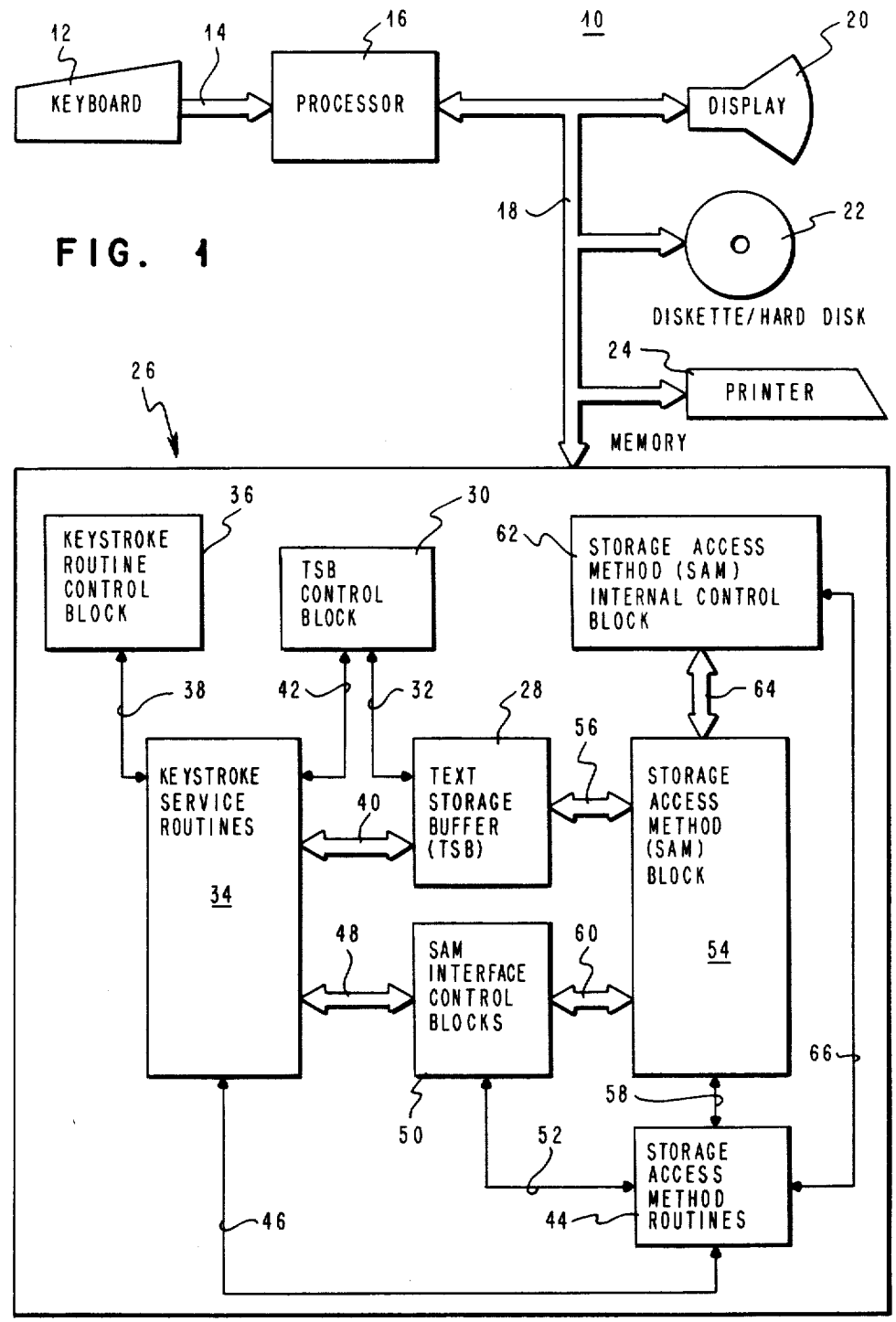
FIG. 1 is a block diagram of the word processing system embodying the present invention.

Referring now to FIG. 1, there is shown a word processing system 10 which includes a keyboard 12 for receiving text and operator commands and transmitting the input through a channel 14 to a processor 16. A memory bus 18 is connected to the processor 16 as well as to a display 20 (such as a CRT), one or more DASD devices 22 (such as diskette or hard disk), a printer 24, and a memory 26.

An operator enters a text stream through the keyboard 12 and each page of text is stored and processed in the memory 26. As the text stream is received in memory 26, it is also presented on the display 20. After the text has been entered into the keyboard 12, it can be stored on the diskette or hard disk 22 or printed out on the printer.

The memory 26 includes a number of data areas and functional programs for operating with the text stored in the system 10. The text and related control functions are stored in a text storage buffer (TSB) 28.

A TSB control block 30 serves as the data area for the TSB 28. Block 30 is connected through a channel 32 to the TSB 28.

As each character is input through the keyboard 12, it is received at the memory 26 through a collection of keystroke service routines 34. A keystroke control block 36 is a data area which determines the selected keystroke service routine for processing the received character. Block 36 is linked to the keystroke service routines 34 through channel 38. The keystroke service routines block 34 is further linked through a channel 40 to the TSB 28 and through a channel 42 to the TSB control block 30.

When the TSB control block 30 indicates that text must be moved into or out of TSB 28, this movement request is communicated to the storage access method (SAM) routines 44 via channel 46. The SAM routines 44 serve to control all data movement between the diskette or hard disk 22 and memory 26. Corresponding access method routines for the keyboard 12, display 20, and printer 24 are substituted for block 44 when communication with these units is required. The keystroke service routines 34 communicate further control information and data to the SAM routines 44 through channel 48 to the SAM interface control blocks 50. Corresponding access method interface control blocks for the keyboard 12, display 20, and printer 24 are substituted for block 50 when communication with these units is required. Upon completion of the SAM service request, the SAM interface control blocks 50 will contain further information and data to be used by the keystroke service routines 34 for continued processing. The SAM interface control blocks 50 are connected to the SAM routines 44 by a channel 52.

A SAM block 54 is connected via channel 18 with the diskette or hard disk 22. This block 54 serves as the transfer point for data transfers between the diskette or hard disk 22 and memory 26. Corresponding blocks for the keyboard 12, display 20, and printer 24 are substituted for block 54 when communication with these units is required. The SAM block 54 is connected to the TSB 28 through channel 56. The SAM routines 44 can access data in the SAM block 54 through a channel 58. Block 54 is linked to the SAM interface control blocks 50 through a channel 60 for the purpose of communicating information and data to the keystroke service routines 34.

A SAM internal control block 62 is provided to contain the current status and information regarding the diskette or hard disk 22. Corresponding blocks for the keyboard 12, display 20, and printer 24 are substituted for block 62 when communication with these units is required. Information is transferred between the diskette or hard disk 22 and block 62 through the SAM block 54 by a channel 64. Information in the SAM internal control block 62 is communicated to and managed by the SAM routines 44 through a channel 66. Block 62 serves to store flags and status information as required by the operation of blocks 44 and 54.

The normal operation of the word processing system 10 is now briefly described with reference to FIG. 1. As the operator enters each keystroke at the keyboard 12 a corresponding signal is transmitted through channel 14 to the processor 16 which enters the keystroke command into the memory 26. Upon receipt of the keystroke command, a keystroke service routine is produced for block 34 to handle the particular command received. The keystroke command is then processed according to whether it is a control command or a graphic entry, and the result of the keystroke processing is entered into the TSB 28. As graphics and commands are built up in the TSB 28, the text information is presented at display 20. When the TSB 28 is in danger of being insufficient to hold the necessary text and commands, the keystroke service routines in block 50 will store control information in the SAM interface control blocks 50 to cause the SAM routines 44 to transfer blocks of information (in units called records) to the diskette or hard disk 22.

Through control commands the operator can transfer information between the memory 26, display 20, diskette or hard disk 22, and printer 24. Selected pages can be called up from the diskette or hard disk 22 into the memory 26 so that the operator can make changes and corrections to the text and then re-enter the corrected text into the diskette or hard disk 22 or have the corrected text printed at the printer 24.

Figure 2:
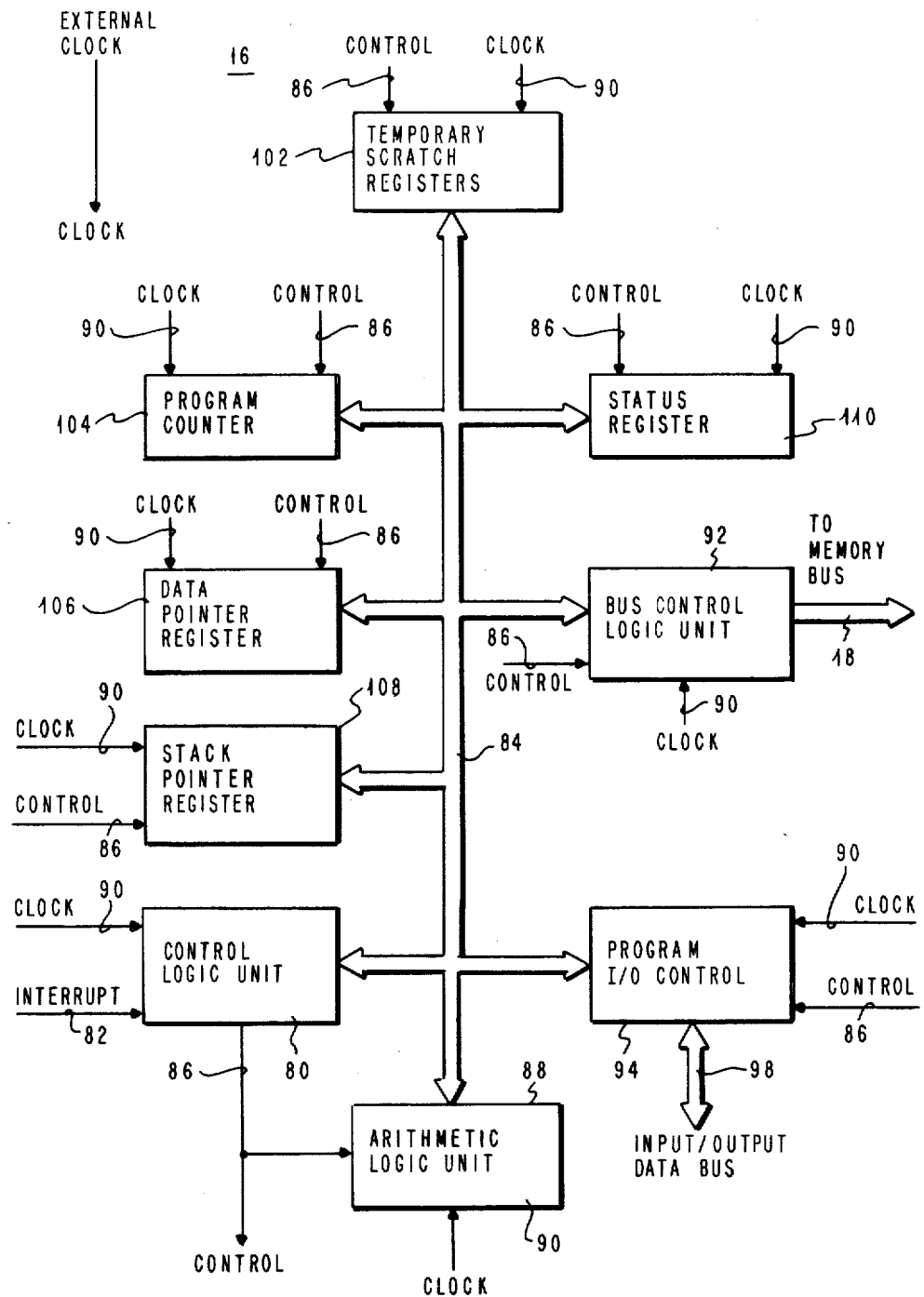
FIG. 2 is a block diagram further defining the processor shown in FIG. 1.

Referring to FIG. 2, the processor 16 is shown in further detail to illustrate typical hardware elements as found in such processors. The processor 16 can be almost any commercially available unit.

Such a processor includes a control unit 80 which responds to interrupts on a device bus 82 from the keyboard 12, the diskette or hard disk 22, or the printer 24. The control unit 80 is also connected to a data and address bus 84 which is interconnected to various other units of the processor 16.

In response to a fetch instruction from the random access memory 26, the control unit 80 generates control signals to other logic elements of the processor 16. These control signals are interconnected to the various units by means of a control line 86 which is illustrated directly connected to an arithmetic logic unit 88 and identified as a "control" line 86 to other elements of the processor. Synchronous operation of the control unit 80 with other logic elements of the processor 16 is achieved by means of clock pulses input to the processor from an external clock source. The clock pulses are generated by the external clock source and transmitted through a bus 90 also shown interconnected to most of the other logic elements of the processor detailed in FIG. 2.

Data and instructions to be processed in the processor 16 are input through a bus control unit 92. Data to be processed may also come from a program I/O control unit 94. The bus control unit 92 interconnects storage elements of the random access memory 26 and receives instructions for processing data received from the I/O control unit 94 or received from the memory 26. Thus, the I/O control unit 94 receives data from the keyboard 12 or the diskette or hard disk 22 or the random access memory 26, while the bus control logic receives instructions and/or data from the same memory. Note, however, that different storage sections of the random access memory 26 are identifiable for instruction storage and data storage.

Device control information from the processor 16 is output through the program I/O control controller 94 over an I/O data bus 98. Input data on the data bus 98 from the keyboard 12 or other device is processed internally through the processor 16 by instructions through the bus 84 to the control unit 80 by the arithmetic logic unit 88. The arithmetic logic unit 88, in response to a control signal on line 86 and in accordance with instructions received on the memory bus 18, performs arithmetic computations which may be stored in temporary scratch registers 102.

Various other transfers of data between the arithmetic logic unit 88 and other logic elements of the processor are, of course possible. Such additional transfers may be to a program counter 104, a data pointer register 106, a stack pointer register 108, or a status register 110.

Also connected in the data stream for these various logic elements by means of the bus 84 is a status register 110. The particular operation of the processor is determined by instructions and data on the memory bus 18 and input data on the bi-directional bus 98. As an example, in response to received instructions, the processor transfers data stored in the scratch register 102 to any one of the registers 106, 108, 110. Such operations of processor 16 as detailed in FIG. 2 are considered to be well known by one of ordinary skill in the data processing field. A detailed description of each operation of the processor of FIG. 2 for the described invention is not deemed necessary for an understanding of the invention as claimed.

Pages stored in the storage media on the storage device (diskette or hard disk 22) are partitioned into records, which are units of text of convenient size. Records have a maximum size. Pages thus consist of at least one and possibly more records. The number of records in a page and the number of pages in a document are indefinite, and are constrained only by the capacity of the storage volume to store the data set. A data set in the word processing system 10 is stored on a single diskette or the hard disk. If a document being entered into the system 10 is too large for a single diskette, the operator must terminate the entry operation for the current diskette or hard disk and must continue the document in a different data set on another diskette.

The storage media on the storage device 22 is partitioned into sectors in a manner that is similar to the method of partitioning DASD devices in data processing systems or other word processing systems with DASD storage devices. The concept of a sector is considered to be well known by one of ordinary skill in the data processing field. A detailed description of the concept of sectoring is not deemed necessary for an understanding of the invention as claimed. In the word processing system 10, each sector on the storage media is assigned a unique logical sector number, where logical sector numbers are consecutive non-negative integers beginning with 0. The physical location on the storage media which corresponds to a particular logical sector number is not important to the understanding of the invention as claimed, as long as each logical sector number corresponds to one and only one physical area on the storage volume. Logical sectors are considered consecutive when their logical sector numbers are consecutive integers.

Referring to FIG. 3, an example of a text document is shown as it is organized into a data set 120 on the storage device (diskette or hard disk 22). The data set 120 in this example consists of a data set index 122 and three text pages, a page 1 (124), a page 2 (126), and a page 3 (128). Page 1 (124) has three records, a record 0 (130), a record 1 (132), and a record 2 (134). Page 2 (126) is small enough to be contained in a single record 0 (126). Page 3 (128) requires two records 136 and 138.

A data set index 122 is the means whereby the SAM routines 44 determine where on the storage media the data set pages are located. The data set index 122 contains one index entry for each page of the document, page 1 index entry 140, page 2 index entry 142, and page 3 index entry 144.

In order to facilitate locating the desired page quickly, each page index entry contains a key which identifies the page which is referenced by the entry. Thus, for page 1 (124), there is a page 1 key 146, for page 2 (126) there is a page 2 key 148, and for page 3 (128) there is a page key 150. To locate page 2 (126), page 1 index entry 140 may be determined to be inappropriate simply by comparing the page 1 key 146 with the key of the desired page. In the word processing system 10, all page keys within a data set index must be unique.

The data for each record of a page is located through the index entry by means of a record descriptor. Each record is stored on the storage volume in a set of consecutive logical sectors. The number of logical sectors allocated to a record corresponds to the minimum number of sectors required to contain the record. Only whole sectors are allocated. The record descriptor contains the location on the storage media of the logical sector containing the record whose logical sector number is numerically lowest. The record descriptor also contains the length of the record. In FIG. 3, for example, the record descriptor for page 1 record 0 (130) is found in page 1 index entry 140 record 0 descriptor 152. The remainder of page 1 (124) is described in record 1 descriptor 154 and record 2 descriptor 156. The single record containing page 2 (126) can be located on the storage media by record 0 descriptor 158 in page 2 index entry 142. Page 3 index entry 144 similarly contains record 0 descriptor 160 and record 1 descriptor 162 pointing to page 3 record 0 (136) and page 3 record 1 (138), respectively.

The data set index 122 of a data set stored on a storage volume 22 of system 10 is partitioned into index nodes. Each index node is stored in one logical sector. If additions of text to the data set cause the amount of information in one of the index nodes to grow beyond that which can be stored in one logical sector, the index node is partitioned into two or more index nodes, so that each resulting index node can be contained within one logical sector. Every data set has at least one index node.

Figure 3A:
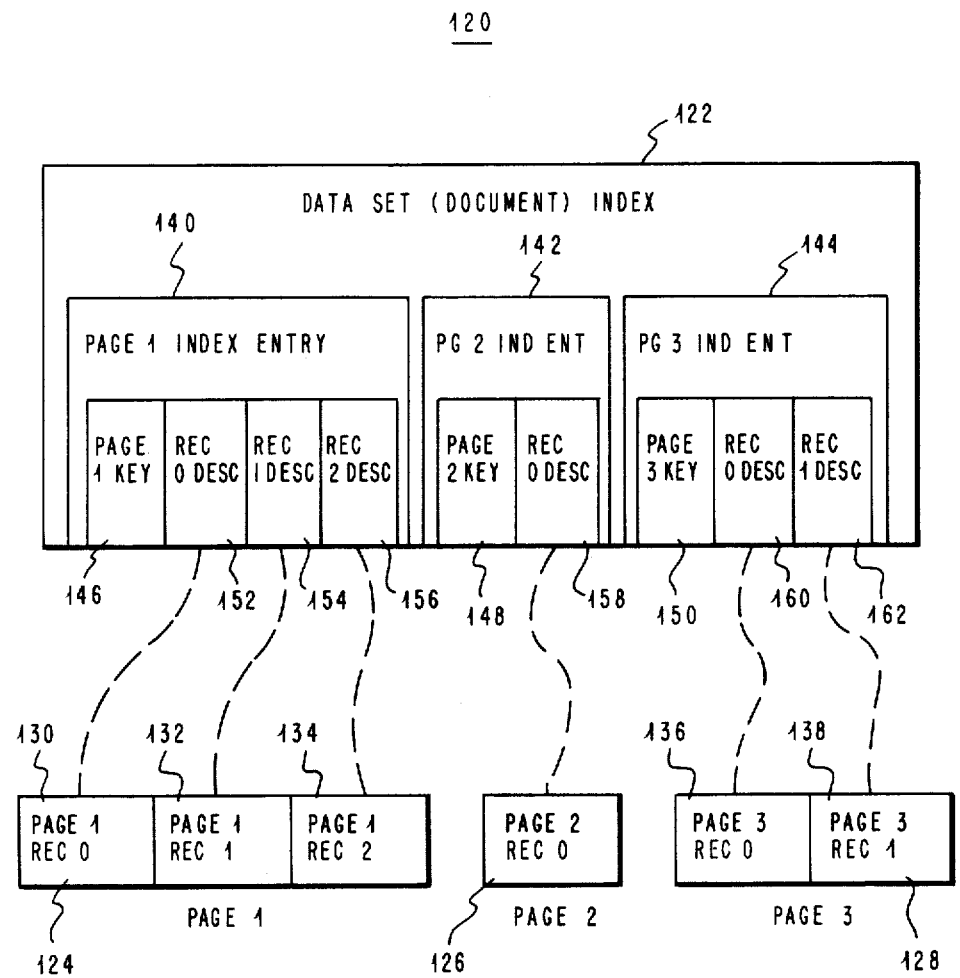
FIGS. 3A-B are block diagrams showing the organization of text within a document on the storage device (diskette or hard disk) and an example of a data set index. Each document or other large grouping of information on the storage device is known as a data set.
Figure 3B:
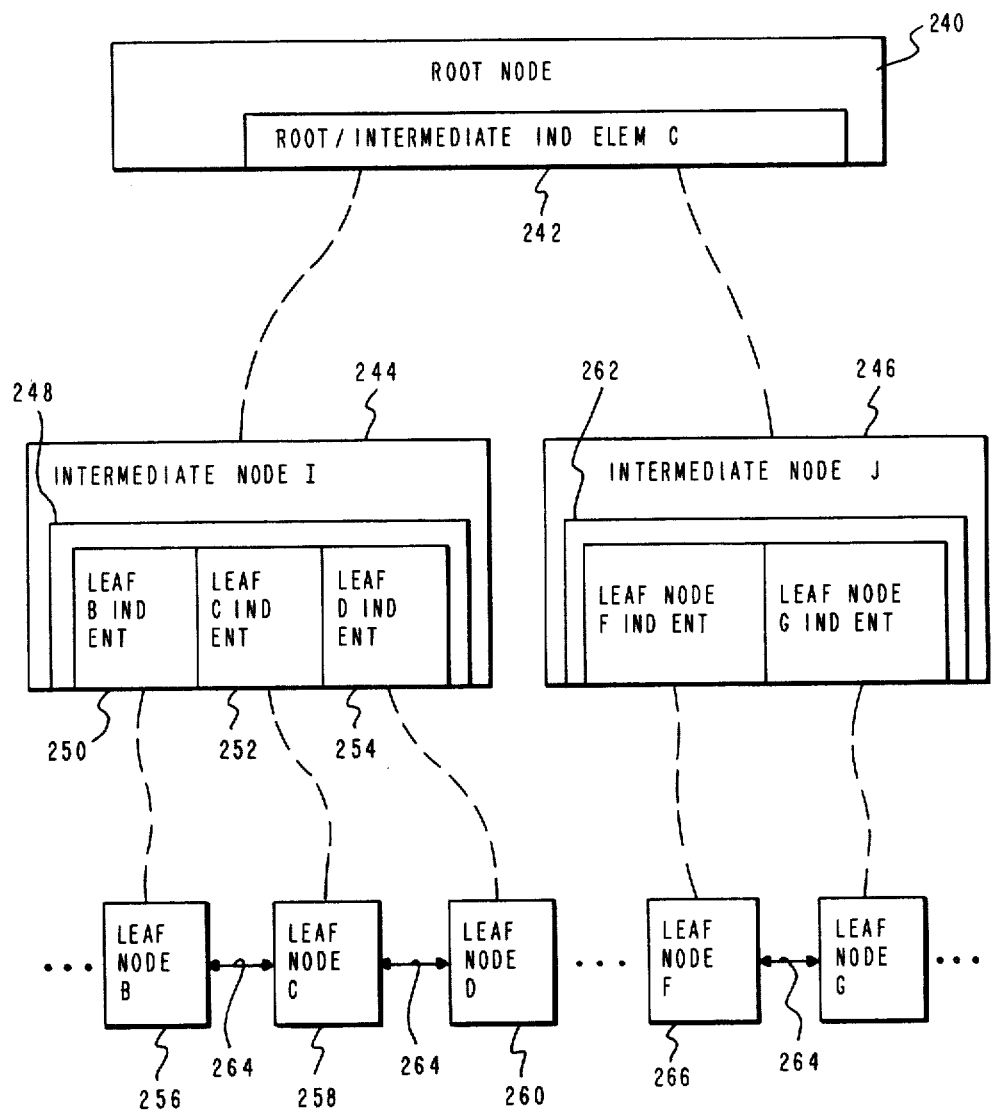

Referring to FIG. 3B, the document index 122 from FIG. 3A is expanded as an example. A root node 240 is the first index node of the data set. Starting from this node, all other index nodes and all data records in the data set may be accessed. Index element component 242 contains the accessing information for the next level of the index, namely intermediate node I 244 and intermediate node J 246. Within intermediate node I 244 there is an index element component 248 containing a leaf B index entry 250, a leaf C index entry 252, and a leaf D index entry 254 which refer to leaf node B 256, leaf node C 258, and leaf node D 260, respectively. FIG. 3B thus shows an example of a 3-level index tree, where the node level of root node 240 would be 2, the node level values for intermediate nodes I 244 and J 246 would 1, and the node level values for all leaf nodes would still be 0. The connections 264 between leaf nodes represent leaf node chains, which are indications in each leaf node of the LSN of the prior leaf node and the next leaf node.

FIG. 3B thus shows an example of a general index structure which allows the storage access method routines 44 to locate a desired page or record in two different ways, depending on the manner of viewing or revising the document. In order to locate the first record of a page referenced in leaf node D (260), the SAM routines 44 would fetch the root node 240 from the diskette or hard disk 22 and would search the root index element component 242 to determine that intermediate node I (244) is the appropriate intermediate node. Intermediate node 244 would then be fetched from the storage media and the leaf node D (260) is similarly selected as the proper leaf node. After fetching leaf node D (260) from the storage media, the index element component of leaf node D (260) is searched to locate the key of the desired page.

On the other hand, if the operator is at the end of the last record referenced in leaf node C (258) and desires to scroll into the next record of text (which is referenced in leaf node D (260), the leaf node chain in leaf node C (258) can be used directly to locate leaf node D (260) on the storage media without requiring that the root node and an intermediate node be fetched and searched again.

Figure 4:
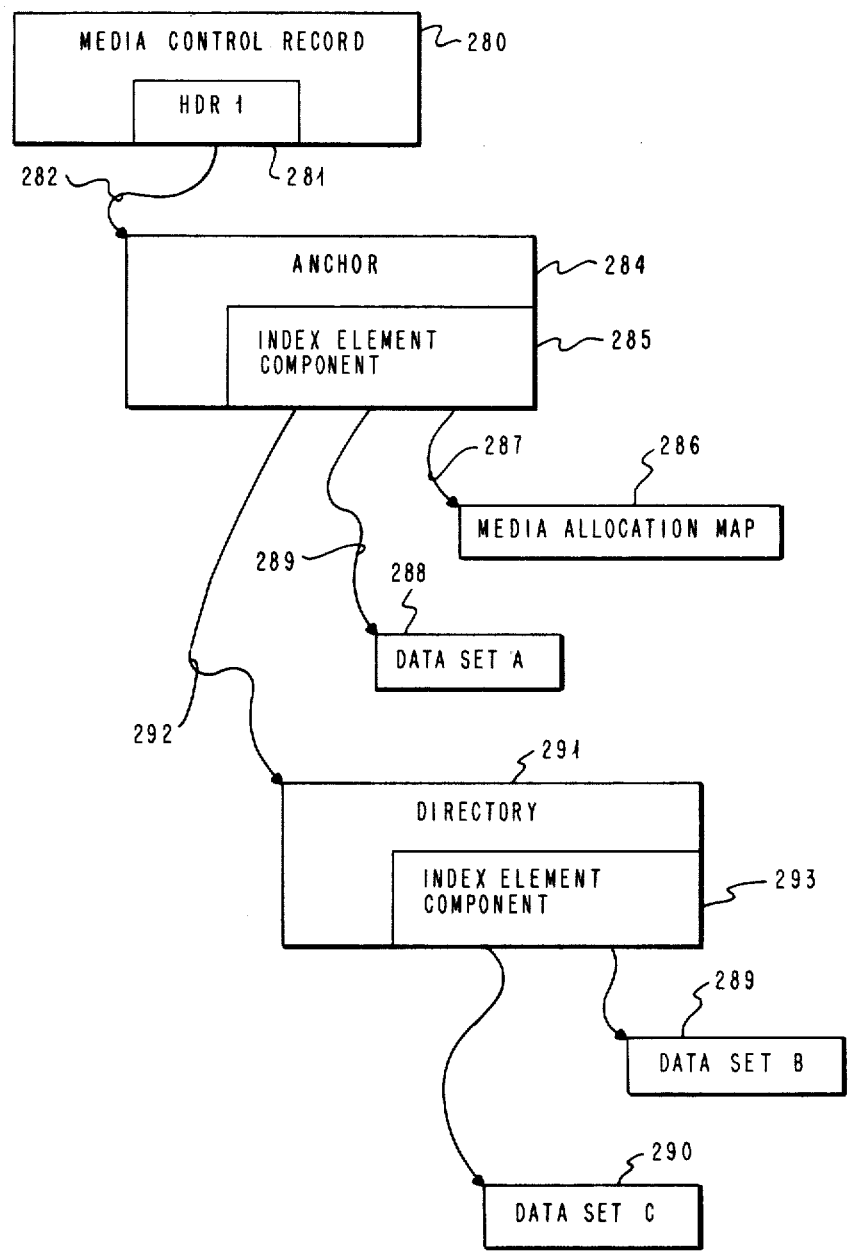
FIG. 4 is a block diagram of an example of the relationships between volume and data set indexes. It is an extension and generalization of FIG. 3.

The index structure shown as an example in FIG. 3B can be generalized from a single data set to an entire volume, by constructing the volume as a hierarchy of indices. FIG. 4 shows a block diagram of an example of a volume index. In this example, the storage volume contains three data sets. Two of the data sets have the same data set type (for example, both are text documents). The third data set has a different data set type.

For each storage volume, there is a media control record 280 which contains information about the volume as a whole, such as volume label (volume name). Within the media control record 280 there is a field called a hdr1 field 281. The purpose of the hdr1 field 281 is to provide information about the data residing on the volume. In particular, there is an anchor location pointer 282 (symbolized by a curved arrow from the media control record 280 to the anchor 284). The anchor location pointer 282 serves to show the location on the volume of an anchor 284.

The anchor 284 is the first level of volume index information. The function of the anchor 284 is similar to the volume table of contents on a DASD storage volume in a data processing system. In the word processing system 10, the anchor 284 is structured as a data set index. In particular, the format of the anchor is that of a root/leaf node, which is a combined root node and leaf node. However, instead of referring to records and pages of a document as in FIG. 3A, the anchor 284 refers to volume information or other data sets. As with other index nodes, the anchor 284 contains an index element component 285 which refers to the lower-level data.

The format of the anchor index element component 285 is similar to the index element component 173 shown in FIG. 4B. In the anchor 284, the key of the index entry (similar to the page N1 key 178) is constructed from data set type. Thus, there is one index entry in the anchor 284 for each unique data set type existing on the storage volume.

A media allocation map 286 provides an indication of the allocation status of each sector on the storage media. In word processing system 10, the media allocation map contains one indicator for each sector on the media. The indicator shows whether or not the sector is available for allocation to a data set. The indicators for all existing index nodes and data set records indicate not available; in other words, these sectors have already been allocated. The index entry for the media map 286 in the anchor index element component 285 has as the key the unique data set type assigned to the media allocation map, and has as the record descriptor the logical sector number 287 and length of the media allocation map 286 on the volume.

In the example provided by FIG. 4, it is assumed that data set A 288 is the only data set of its type on the volume. Therefore, the index entry in the anchor index element component 285 consists of a key constructed from the data set type of data set A 288 and a logical sector number 289 showing the logical sector number of the root node of data set A 288.

Data set B 289 and data set C 290, however, are assumed to have the same data set type. Since the keys in an index element component must be unique, and since keys constructed from the data set types of data set B 289 and data set C 290 would be equivalent, another level of index is introduced to provide for this requirement. A directory 291 is a data set index the data for which consists of lower-level data sets. The data set type of directory 291 is the same as the data set type of all data sets to which it refers. Therefore, the index entry in anchor index element component 285 uses a key derived from the data set type of director 291 and refers to the directory root node via a logical sector number 292.

The directory index element component 293 refers to data set root nodes. The keys for index entries in index element component 293 are the names of the data sets in word processing system 10, data sets on a single storage media are required to have unique data set names. Thus, the keys in director index element component 293 are unique.

Like all other data set indexes, director 291 may be expanded to multiple levels as the number of data sets is increased to the point that a single root/leaf is not sufficient to contain the index entries for all data sets of that data set type. Since the number of unique data set types in word processing system 10 is limited, however, it is never necessary to expand the anchor 284 larger than a root/leaf.

Figure 5A:
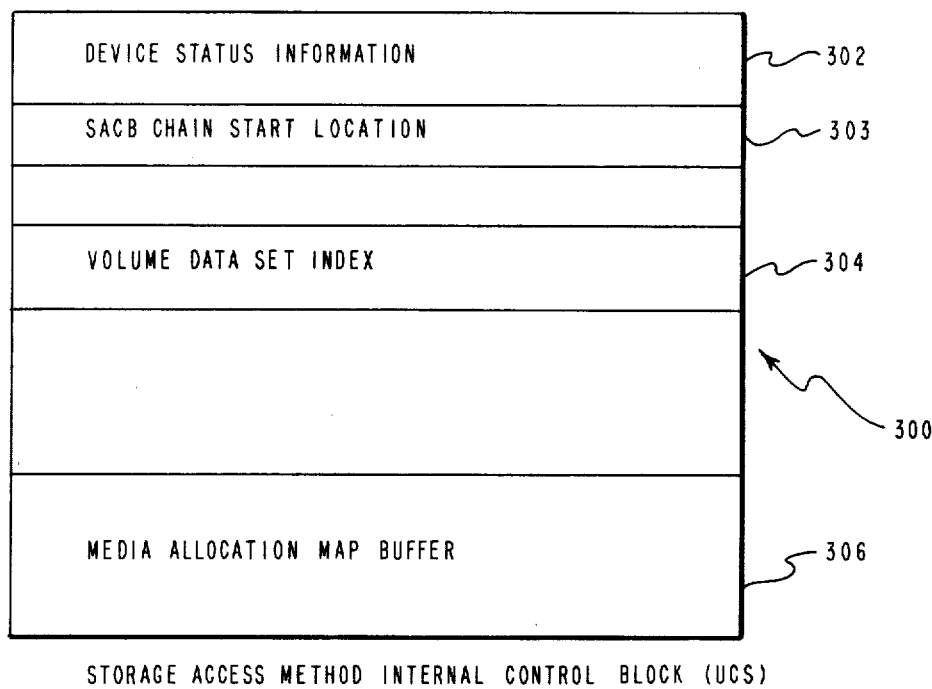
FIGS. 5A-C are diagrams further defining the Storage Access Method (SAM) Internal Control Block section shown in FIG. 1.

FIG. 5A provides more detail regarding a part of the storage access method internal control block 62 shown in FIG. 1. A unit control block/storage (UCS) 300 contains device and operation status and control information and provides buffer areas for the access and updating of data set and volume indexes. The term volume refers to a single diskette or a hard file attached to the word processing system 10. Each volume available for processing by the system has its own UCS.

A device status information area 302 contains data and control indicators used by the storage access method routines 44 to control the actual input/output operations to the diskette or hard disk devices 22. Device status information 302 is also used by the storage access method routines 44 to determine which of the available volumes should be accessed during the processing of a request from the keystroke service routines 34.

A storage access control block (SACB) chain start location 303 provides the location of the first SACB in the SACB chain. When a data set is opened for access, a SACB is provided to contain relevant information for as long as the data set is open for access. The SACB chain start location 303 shows the location of the first data set SACB, or contains a null value to indicate no open data sets. Within each SACB there is a location pointer to the next SACB chain. A null next SACB pointer indicates the end of the SACB chain.

A volume data set index buffer 304 contains the first level of volume index called an anchor. This buffer contains the anchor 284 in FIG. 4 for the volume in the diskette or hard disk device 22. The anchor is retained in system memory 26 in order to eliminate an input operation from diskette or hard disk 22 when a data set must be located on the volume. Locating a data set on the volume is very similar to locating a page within a data set, where the keys in the volume index consist of the type of data set (text document, for example) and the data set name.

A media allocation map buffer 306 provides space for the media allocation map for the storage volume. This buffer will contain a copy of the media allocation map 286 (refer to FIG. 3B) for the volume in the diskette or hard disk device 22.

The rest of UCS 300 is used for internal status and control information and to contain the results of various intermediate calculations and operations, a detailed explanation of which is not deemed necessary for an understanding of the invention as claimed.

Figure 5C:
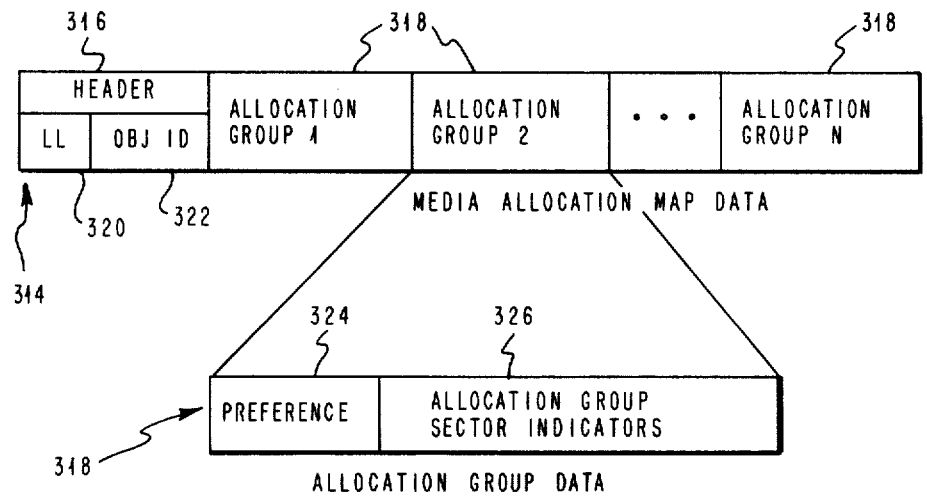
Figure 5B:
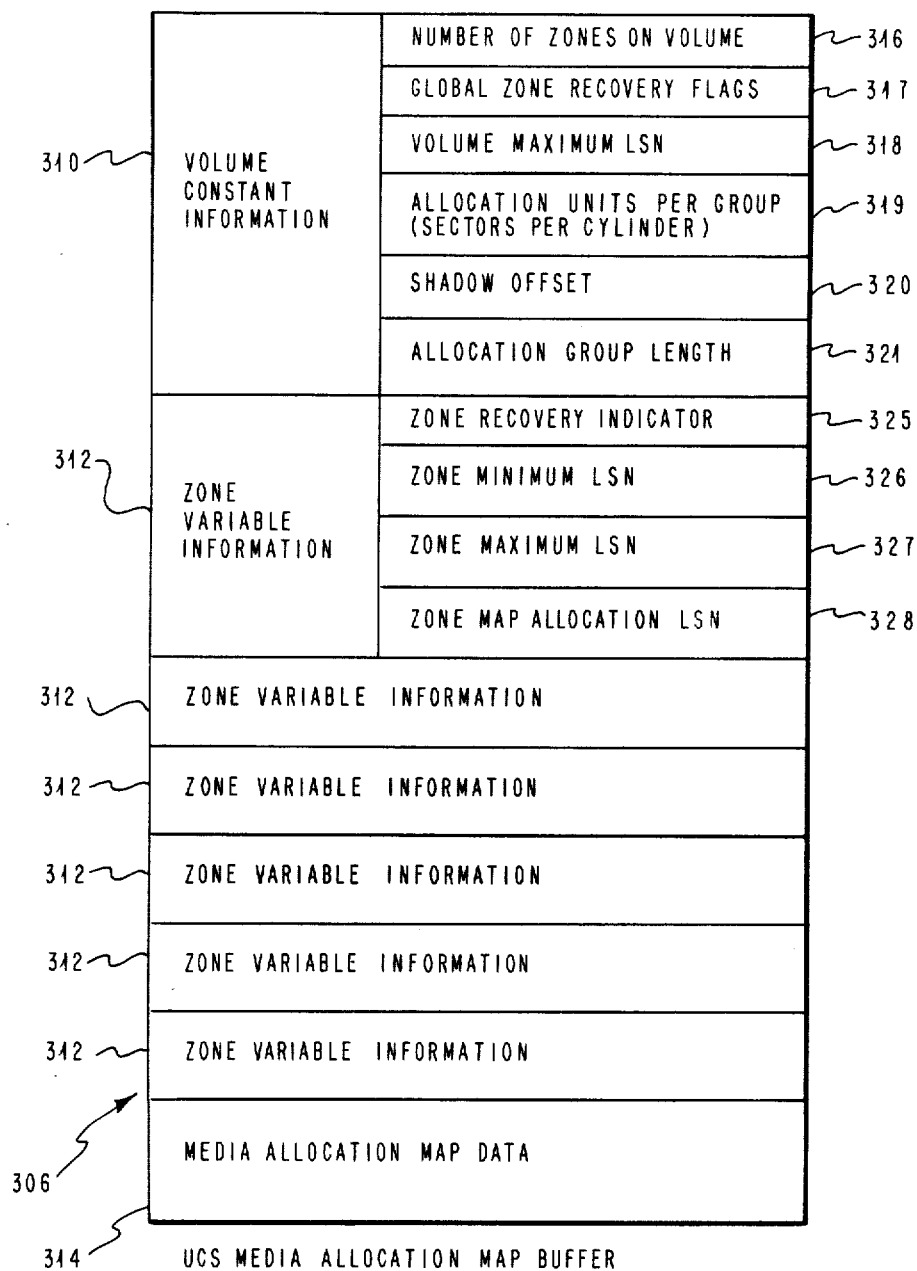

FIG. 5B is a block diagram showing more details regarding the media allocation map buffer 306 first shown in FIG. 5A. The media allocation map buffer 306 contains three information sections, a volume constant information section 310, several zone variable information sections 312, and a media allocation map data section 314.

Volume constant information 310 contains information regarding the media allocation map which is constant for the entire volume. This information includes number of zones on the volume at present 316, global zone recovery required indicators 317, volume maximum LSN 318, allocation units per group 319, shadow offset 310, and length of an allocation group map 321.

Zone variable information 312 contains that information which is different for each zone on the volume. FIG. 5B shows 6 sets of zone variable information, so for this example the maximum number of zones which may be supported is 6. Zone variable information includes a zone recovery indicator 325, zone minimum LSN 326, zone maximum LSN 327, and location of zone map on volume 328.

FIG. 5C shows a block diagram providing more detail regarding the structure of media allocation map data 314 shown in FIG. 3B. The media allocation map data 314 for a zone consists of a header 316 and one or more allocation group maps 318. Within the media allocation map buffer 306, the media allocation map data for existing zones is stored consecutively.

An allocation group is simply a convenient grouping of sectors. An allocation group 318 belongs to a single zone; it is never split across zone boundaries. In the word processing system 10, an allocation group corresponds to one cylinder on the physical storage media. Allocation groups may be of different size for different types of storage media. Thus, in word processing system 10, an allocation group on a diskette contains 16 logical sectors, and an allocation group on a hard disk contains 102 logical sectors. Regardless of media type, all logical sectors are the same size in word processing system 10.

The header 316 consists of an overall zone map data length 320 and an object ID 322. The object ID 322 identifies the data as a media allocation map, and contains the same value for all zone media maps.

The allocation group data 318 contains two sections, a preference indication 324 and allocation group sector indicators 326. The preference indication 324 allows sectors in allocation groups to be allocated according to a preference, for example, large allocation blocks, index nodes, and so on. The allocation group sector indicators 326 contains an indication for each logical sector in the allocation group of whether or not the sector is available to satisfy future storage media allocation requests. All allocation groups on a given volume in word processing system 10 are the same size. The volume constant information section 310 (FIG. 5B) contains the number of allocation units (sectors) per allocation group (cylinder) 319 and the length of an allocation group data map 321.

Figure 6A:
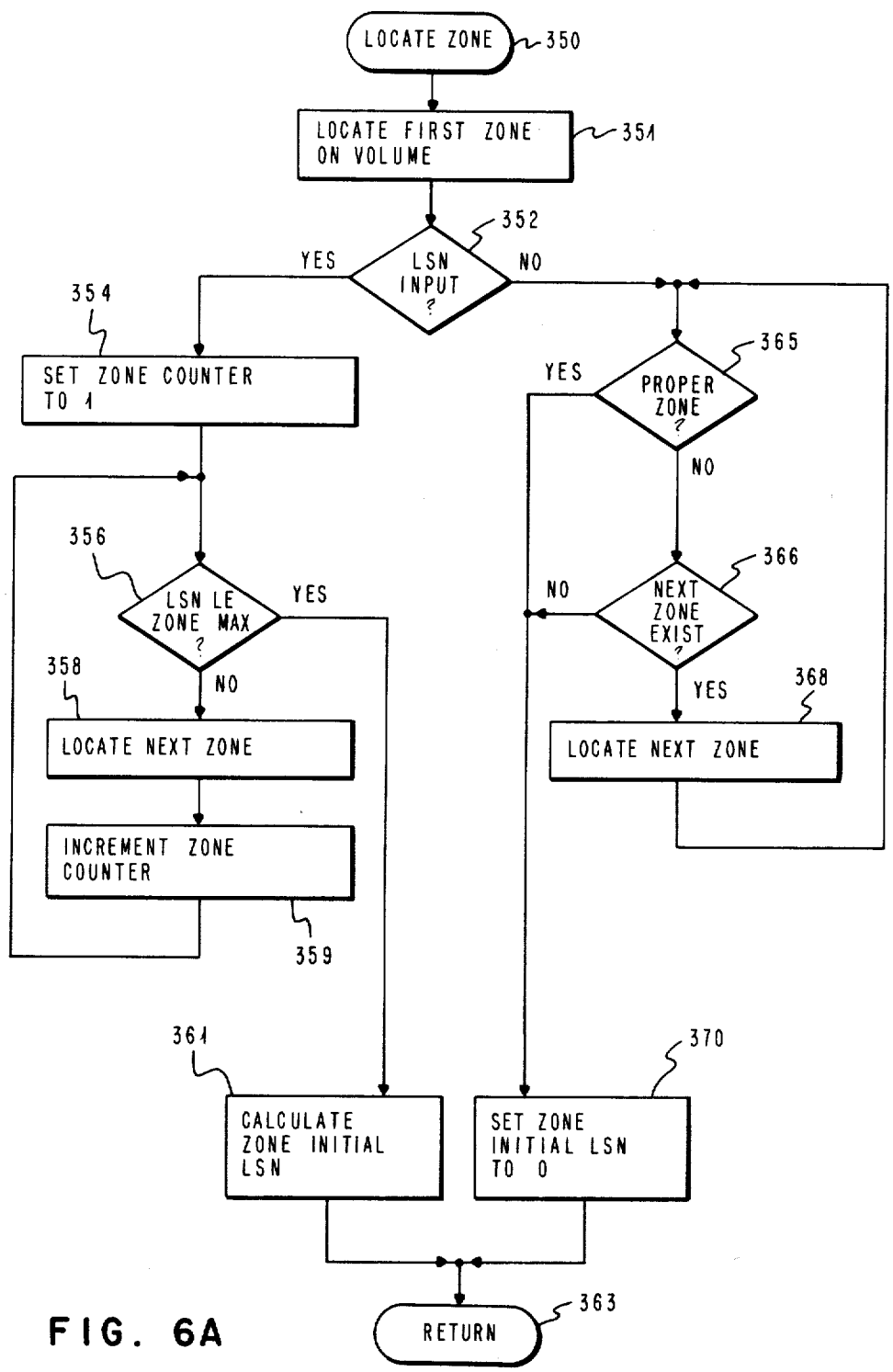
FIGS. 6A-6B are flow diagrams showing the operational steps of the present invention with respect to allocation of space from the media allocation map.

One of the areas of operation within the storage access method routines 44 of word processing system 10 which must support multiple zones is the area of media allocation handling. A logical operation of the present invention with respect to Locate zone in the media allocation handling area is illustrated in the flow diagram shown in FIG. 6A. The procedure is started with the locate zone service routine step 350. In step 351 the first zone on the volume is located. Locating a zone means providing access to the proper zone variable information and determining the location in UCS 300 of the zone media allocation map data. For the first zone, both locations within UCS 300 are fixed.

There are two methods of selecting a particular zone by the logical sector number of a sector contained in the zone, and by zone number. In step 352 a test is made to see which method was used by the procedure requesting the locate zone service.

If selection by LSN was chosen, the zone variable information section must be searched to find the first zone whose maximum LSN is greater than or equal to the input LSN. In step 354, a zone counter is initialized to the first zone. The zone maximum LSN is then compared with the input LSN in step 356. If the input LSN is not within the current zone, the next zone is located in step 358 by adding the length of the current zone map data to the current zone map data location pointer, and moving to the next zone variable information field. In step 359, the zone counter is also incremented, before proceeding back to the test in step 356.

When the proper zone has been located, the initial LSN for further operations within the zone is calculated in step 361 by subtracting the zone minimum LSN from the input LSN. The procedure is then terminated in step 363 until the next request for locate zone is received.

If the locate zone procedure is to operate according to an input zone number, step 365 tests to see if the proper zone has already been located. If so, the initial LSN for further processing is set to 0 in step 370, and the procedure is terminated in step 363 as before. If not at the proper zone, step 366 tests to see if the next zone exists on the volume. This is done by testing the high LSN for the next zone. If the next zone does not exist, this value will be 0, which is an invalid value for a high LSN (since there must be at least one allocation group in a zone). If the next zone does not exist, the current (last existing) zone is selected as a default, by proceeding to step 370 and step 363 as above. If the next zone exists, it is located in step 368 in the same manner as described for step 358.

Figure 6B:
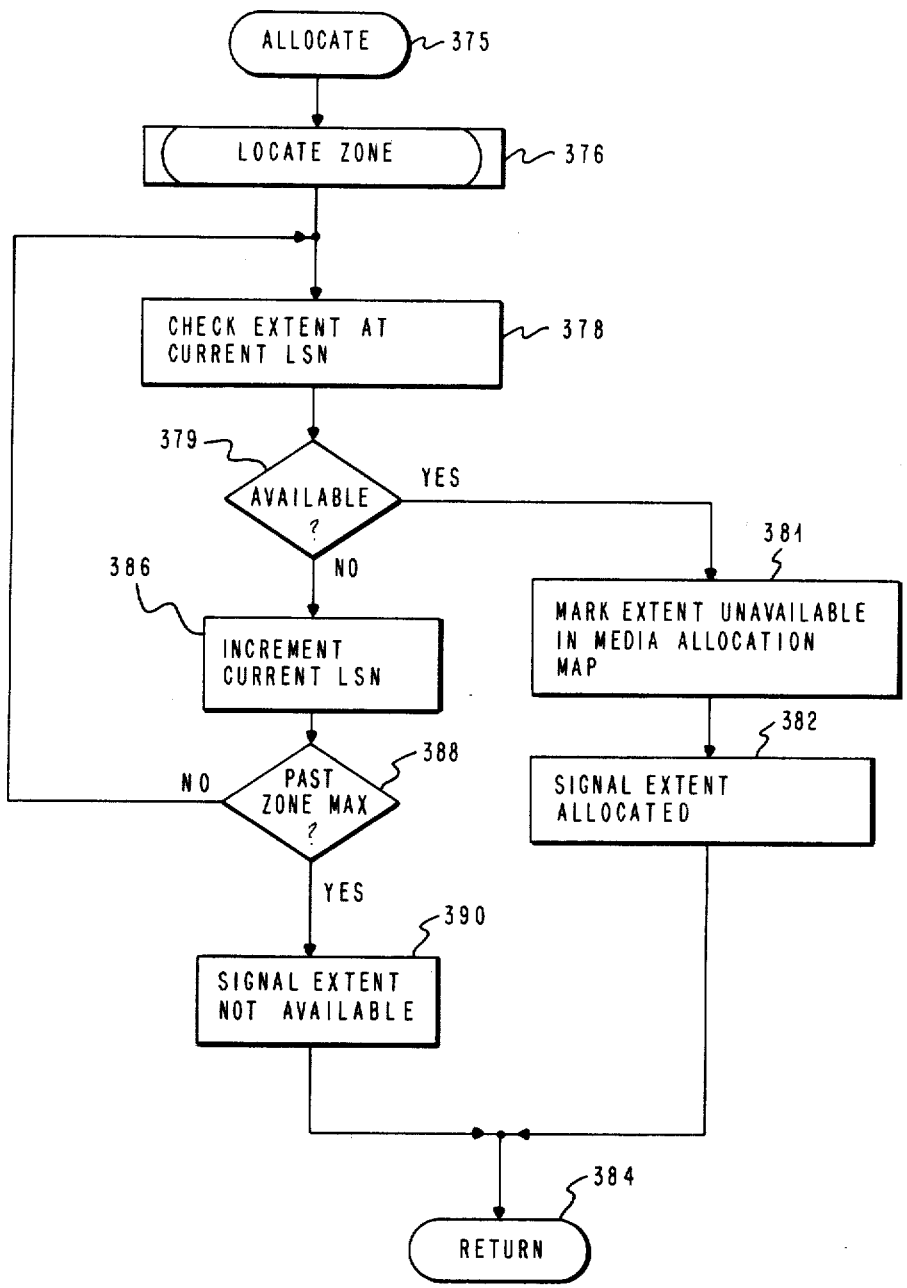

A logical operation of the present invention with respect to Allocate space on the storage volume is illustrated in the flow diagram shown in FIG. 6B. The procedure is started with the allocate service routine step 375. An allocation request will specify the desired zone (by zone number or logical sector number within zone) and the number of consecutive sectors to be allocated. This block of contiguous sectors is called an extent.

In step 376, the locate zone procedure is performed to locate the proper zone in which to allocate space. This procedure will provide the logical sector number within the zone at which to begin the checking. If it is found in step 379 that the extent is available starting at the current LSN, the extent starting with the current LSN is marked as no longer available in step 381. Finally, successful extent allocation is signalled in step 382 to the requesting procedure via a return code mechanism, and the procedure is terminated in step 384 until the next allocation request is issued.

If one or more sectors in the extent starting at the current LSN was found to be unavailable in steps 378 and 379, the current LSN is incremented in step 386. The result is checked in step 388 against the maximum LSN for the zone. If the new current logical sector number is still within the zone, the new extent is checked in step 378 as above. If the new extent is not within the current zone, the requested allocation cannot be satisfied within the requested zone. Extent not available is signalled in step 390, and the procedure is terminated in step 384 as before.

Figure 7:
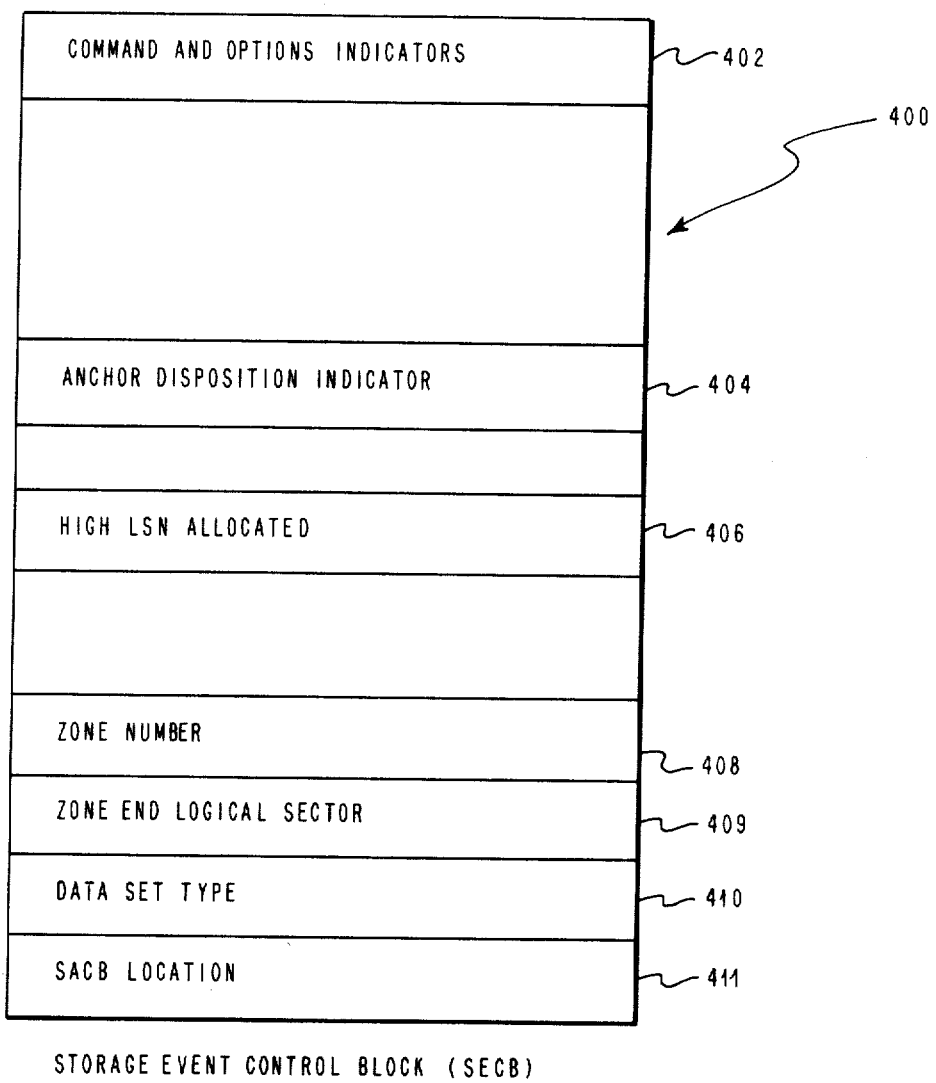
FIG. 7 is a diagram further defining a portion of the SAM interface Control Blocks shown in FIG. 1, specifically the storage event control block.

FIG. 7 provides more detail regarding a part of the storage access method interface control block 50 shown in FIG. 1 which is related to the present invention. A storage event control block 400 contains the command, options, and all necessary information for the keystroke service routines 34 to communicate a service request to the storage access method routines 44, and for the storage access method routines 44 to communicate the results of the service request in return.

A command and options indicators area 402 contains the command requested and option indicators to modify the command request. An example of this would be a Format command with option modifiers specifying that the zone partition option of Format is desired.

An anchor disposition indicator 404 indicates whether the anchor is to remain where it is or be moved to the new zone when create new zone (Format zone partition) is requested.

A high LSN allocated buffer 406 allows the storage access method routines 44 to communicate to the keystroke service routines 34 the highest logical sector that has been allocated since the high LSN was initialized.

A zone number 408 allows the keystroke service routines 34 to specify in which zone a new data set is to be created. This parameter is ignored if a data set of the same type already exists on the volume, since all data sets of the same type must reside on the same volume.

A zone end logical sector 409 allows the requesting procedure to specify the last allocation group to be retained in the current zone when the current zone is partitioned into two zones.

A data set type 410 specifies the type of a data set to be created on the storage volume for Open Create.

A storage access control block (SACB) location buffer 411 contains the location in system memory 26 of the storage access control block, which is an interface control block used for storage access method requests involving access to a data set.

In an environment with possibly more than one zone on the volume, there are two requirements relevant to this invention placed on the storage access method function of Open data set for access: store new data sets in the proper zone; and provide for zone recovery indicators. As disclosed in a related patent application entitled "Storage Access Method Volume Recovery Algorithms", an indication must be maintained when the possibility exists for an error in data set and volume indexes. In order to determine which zones on the volume require recovery and which zones may be skipped, similar information must be maintained for each zone.

Figure 8A:
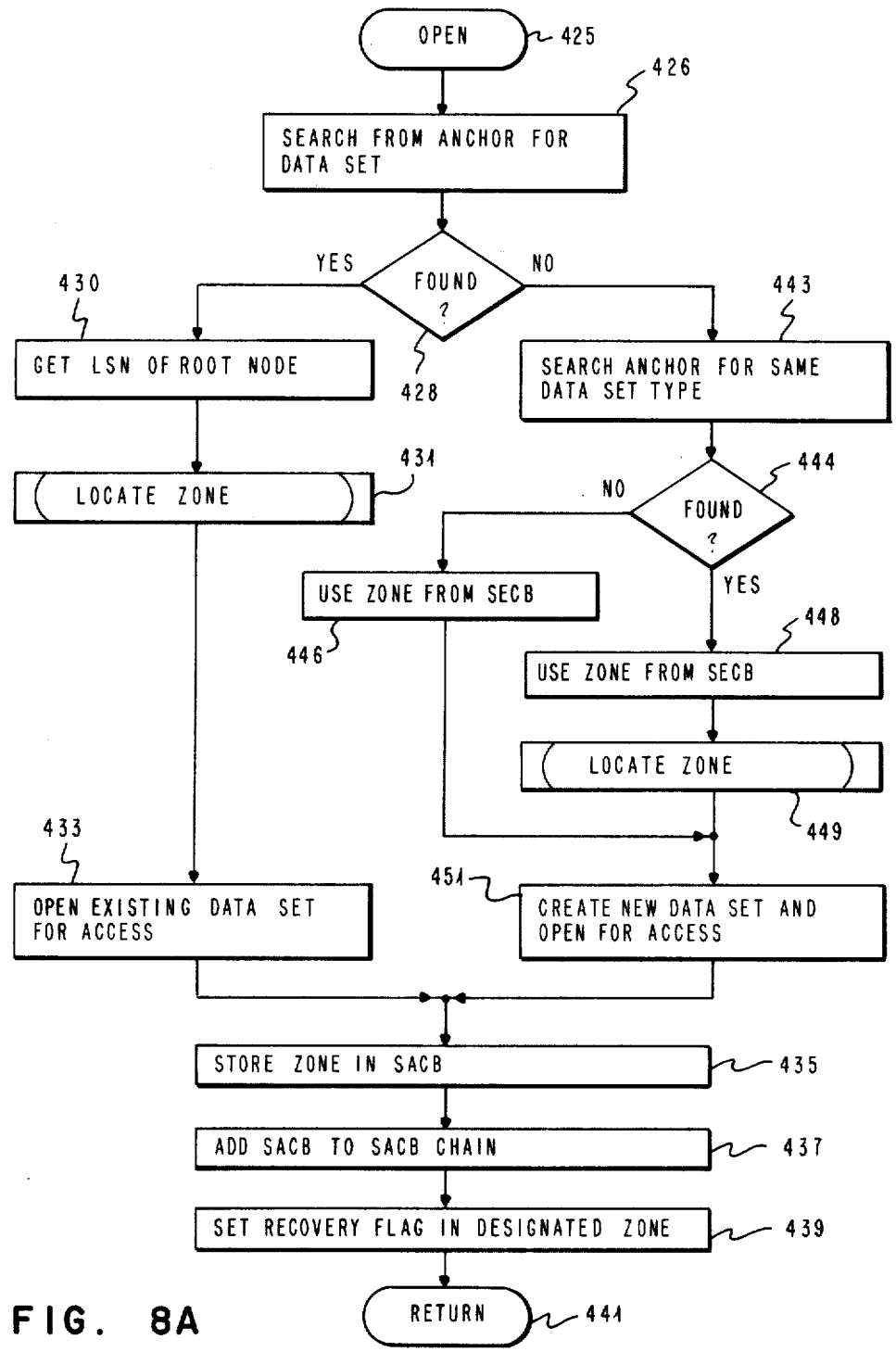

A logical operation of the present invention with respect to Open data set for access is illustrated in the flow diagram shown in FIG. 8A. The procedure is started with the open service routine step 425. In step 426, a search is made starting with the anchor and continuing through the directory (if a directory exists) to see if the requested data set already exists. If the test in step 428 shows that the data set exists, the data set root LSN is obtained in step 430 and the locate zone procedure is performed in step 431 to get the zone containing the data set. The data set is then processed in step 433 to open it for access.

To support the zone recovery status indicators, the data set zone is stored in the SACB in step 435 and the SACB is added in step 437 to the chain of SACBs for data sets open for access on the storage volume. If the open type was update (read/write access), the zone recovery indicator for the data set zone is set in step 439 to indicate that the zone will need recovery if system 10 power is lost before read/write access can be terminated via Close. Finally, the procedure is terminated in step 441 until the next Open data set for access request is sensed.

If the data set was not found, it must be created. The anchor is searched again in step 443 to see if there exists on the volume a data set of the same type, and the results of the search are tested in step 444. If no data set of the same type exists, the root node for that data set is fetched from the anchor in step 448, and the locate zone procedure is performed in step 449 to obtain the zone in which the data set is to be created. The data set root node is created in step 451 and the data set is opened for read/write access at the same time. Thereafter, the SACB and zone recovery indicator operations are performed in steps 435–439, and the procedure is terminated in step 441 as before.

Figure 8B:
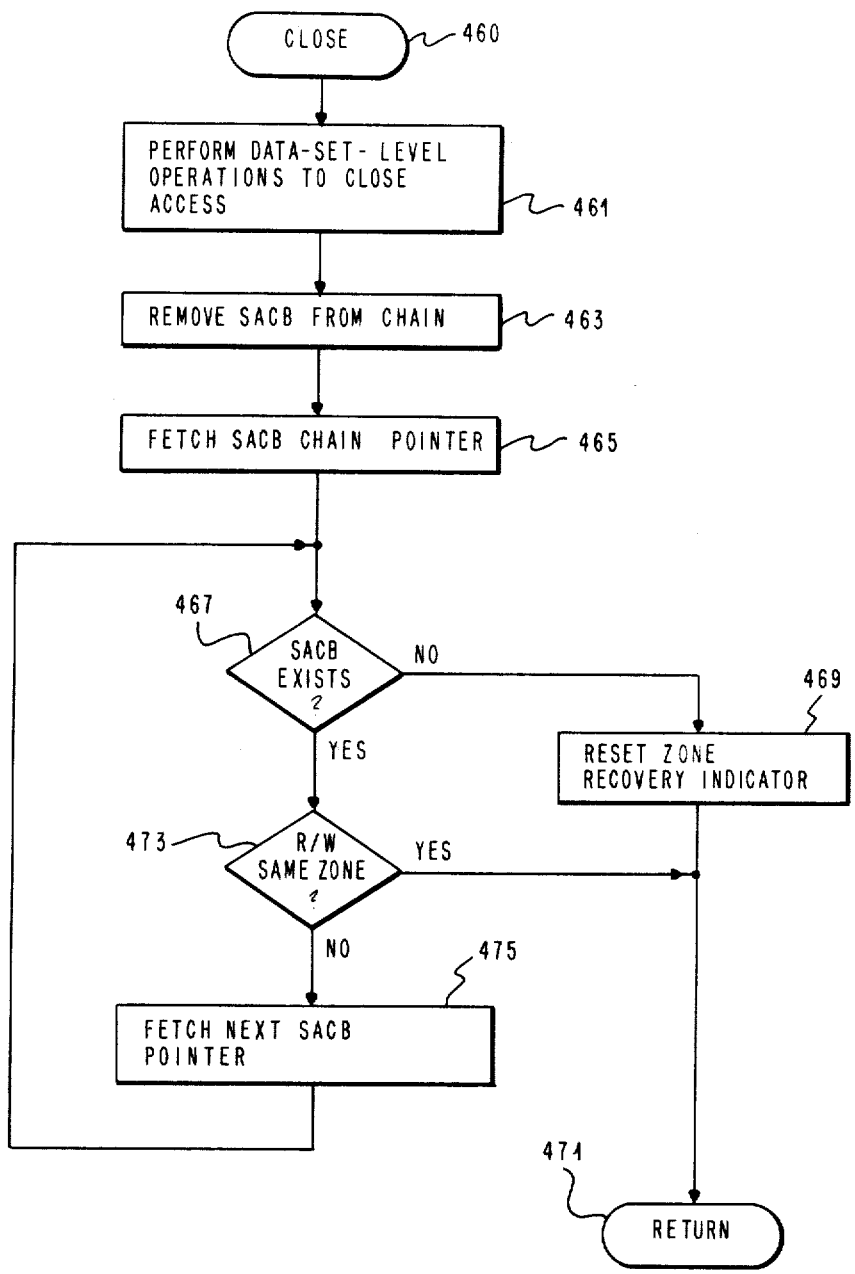

Once read/write access is no longer needed for a data set, a request for Close must be issued to the storage access method routines 44. A logical operation of the present invention with respect to Close data set for access is illustrated in the flow diagram shown in FIG. 8B. The procedure is started with the close service routine step 460. In step 461, the standard operations for closing a data set to access are performed, and the SACB is removed from the chain of SACBs for open data sets in step 463.

Next, the remaining SACB chain must be searched to see if there are any remaining data sets open for update (read/write) in the zone containing the data set just closed. In step 465, the current location of the first SACB is fetched from the SACB chain start location 303 of UCS 300. The current SACB location is tested in step 467 to see if there is still a valid SACB not inspected. If not, no data sets are open read/write in the current zone, so the zone needs recovery indicator is reset in step 469 and the procedure is terminated in step 471 until the next request for close data set is received.

If the SACB exists, it is checked in step 473 to see if it belongs to a data set open for read/write access in the same zone as the data set just closed. If so, no further action is required, and the procedure is terminated in step 471 as before. Otherwise, the location of the next SACB in the chain is fetched from the current SACB, and this SACB is tested similarly in step 467.

One function available on word processing system 10 is displaying the index of volume contents. Included in the information presented to the operator is the total number of documents or other operator data sets, and the percentage of unused space on the storage volume available for future new records, documents, or other data sets. The available space is calculated from the total number of sectors and the number of sectors available for future allocation. When there are multiple zones on the storage volume, documents (all with the same data set type) are stored in only one of the zones. Since unallocated sectors in the other zones are not available for new document pages or new documents, the data set counts and sector counts should be calculated only for the zone or zones in which the operator may store data. On the other hand, other functions require information about the storage volume as a whole, regardless of the number of zones on the volume at the time.

The storage access method function which returns volume statistics or information is called Query DTOC. A logical operation of the present invention with respect to Query DTOC is illustrated in the flow diagram shown in FIG. 9. The procedure is started with the query DTOC service routine step 480. In step 481, the first index entry in the anchor is located, and the statistics are initialized to 0 in step 482.

From the anchor, the index entry LSN is fetched in step 484, and the locate zone procedure is performed in step 485 to determine to which zone the anchor entry refers. In steps 487 and 488, it is determined whether or not to include the entry in the data set counts (in step 490). If the request specified only a single zone and the zone of the entry does not match the input zone, the entry will not be included in the counts.

The next anchor index entry is then located in step 492. If the test in step 493 shows that this is not the end of the anchor, the next entry is then processed according to the operations described for steps 487–492. Otherwise, data sets counts accumulation is completed, and the MAM statistics procedure is performed in step 495 before terminating the Query DTOC procedure in step 497 until the next query DTOC request is issued.

Figure 9:
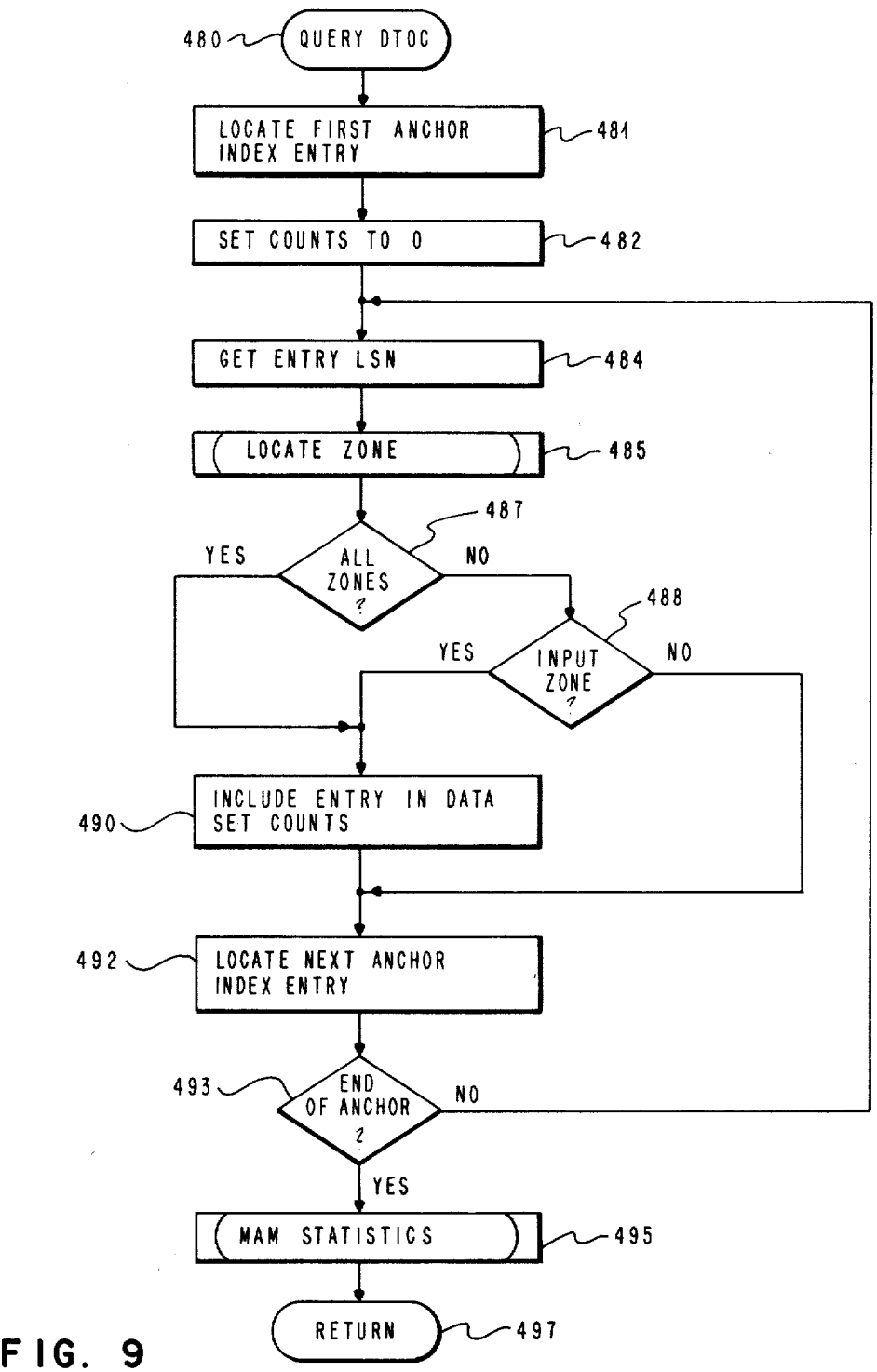
FIG. 9 is a flow diagram showing the operational steps of the present invention with respect to query data set statistics.
Figure 10:
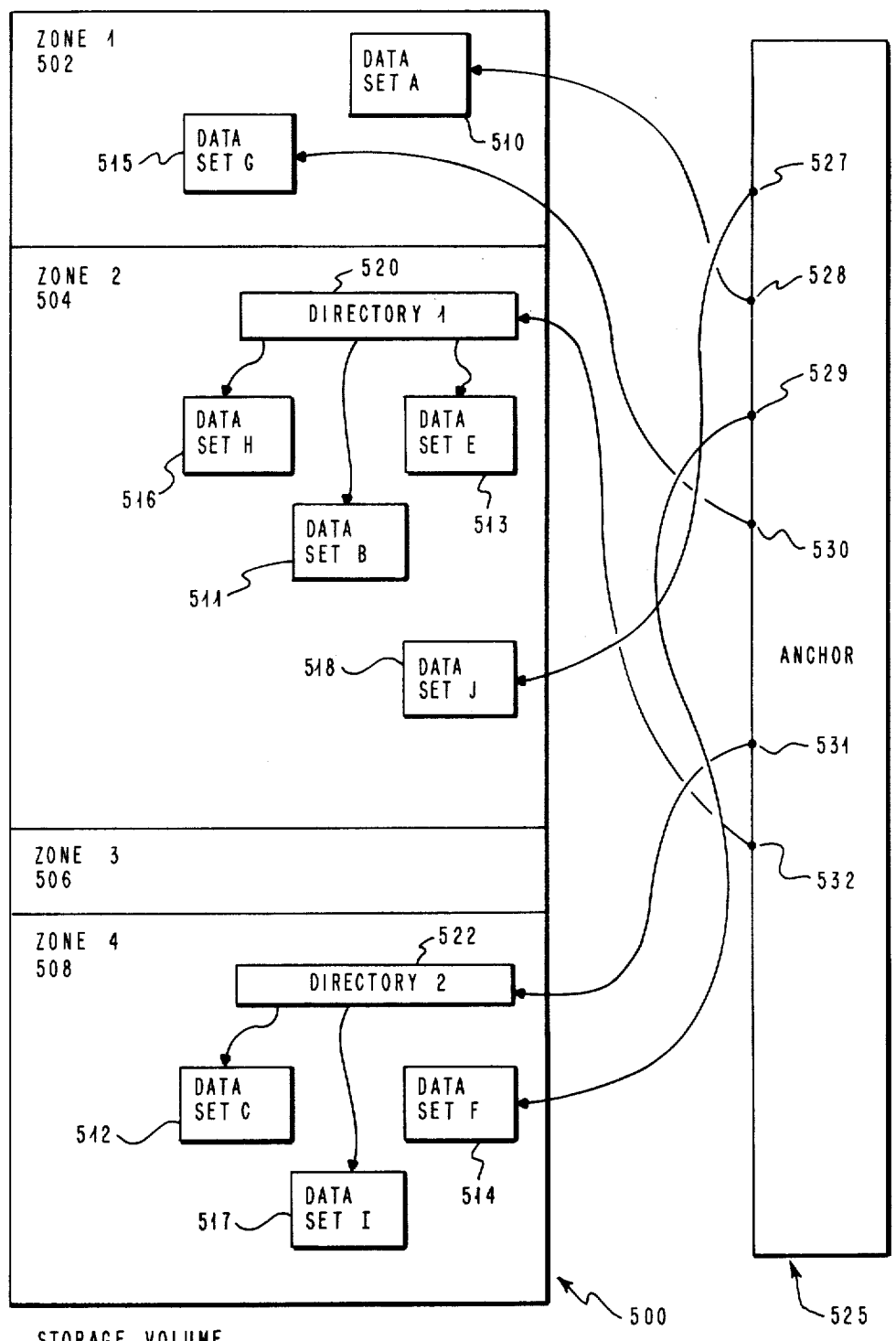
FIG. 10 is a block diagram illustrating an example of a storage volume containing four zones and numerous data sets, and the relationship of the anchor index entries and the zone contents.

As an example of a volume such as was discussed with respect to FIG. 9, FIG. 10 shows a block diagram of a storage volume and the associated anchor. Storage volume 500 contains four zones: zone 1 (502), zone 2 (504), zone 3 (506), and zone 4 (508). Stored on the volume are data sets A 510, B 511, C 512, E 513, F 524, G 515, H 516, I 517, and J 518. Data sets B 511, E 513, and H 516 are all of the same date type, so they are referenced by a directory 1 (520). Likewise, data sets C 512 and I 517 are referenced by directory 2 (522).

Since there are apparently 6 data set types represented on the volume, an anchor 525 contains 6 index entries 527-532. Note that the index entries are located in the anchor in order of data set type. Therefore, there is no relationship between position in the anchor and zone on the volume.

If data set statistics were requested for zone 3 (506) only, a data set count of 0 would be returned, since none of the index entries in anchor 525 would pass the test in step 488 of FIG. 9. On the other hand, anchor 525 index entries 527 and 532 would pass the test if statistics were requested for zone 2, and a data set count of 4 would be returned. Note that the anchor, media allocation maps, and directory data sets are considered internal to the storage access method, and are not counted as data sets for the purposes of volume statistics.

Figure 11:
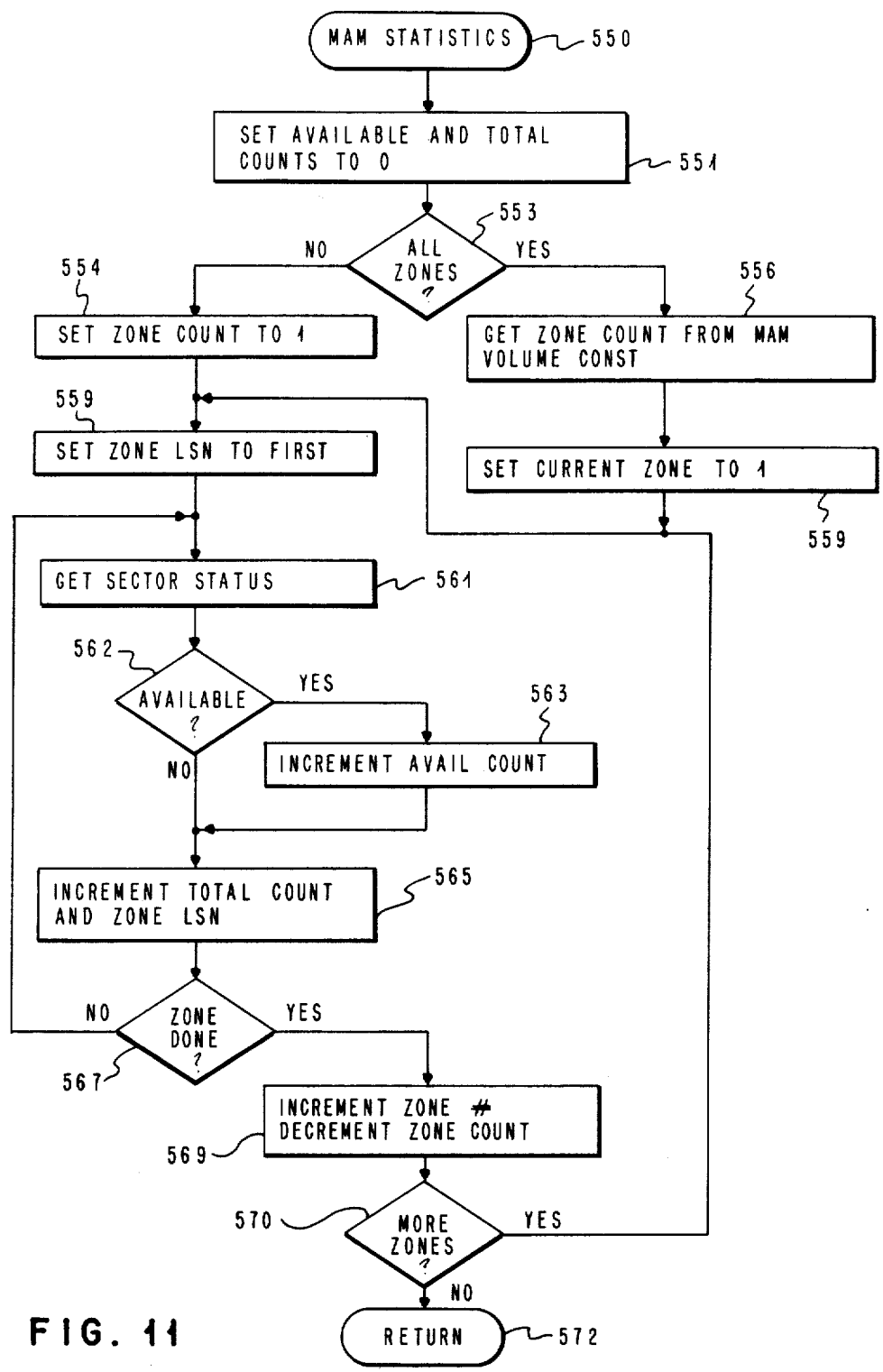
FIG. 11 is a flow diagram showing the operational steps of the present invention with respect to compiling media map statistics for a zone or a volume.

Similar to data set counts, the counts of total and available sectors must be accumulated either for a specific zone or for all zones. A logical operation of the present invention with respect to MAM statistics is illustrated in the flow diagram shown in FIG. 11. The procedure is started with the query MAM statistics routine step 550. In step 551, the counts of total sectors and available sectors are initialized to 0. Then the input is tested in step 553 to see if all zones are to be considered or only a specific zone. If only one zone, a zone count is set to 1 in step 554. Otherwise, the number of zones 316 is fetched in step 556 from the volume constant information section 310 of the UCS media allocation map buffer 306, and the current zone is set to 1 in step 557.

In step 559 the current LSN is set to the initial LSN for the zone to start processing of a zone. Then the sector status is fetched in step 561. If the status is unallocated in step 562, the count of available sectors is incremented in step 563. The total sector count and current zone LSN are then incremented in step 565. If the zone is not yet finished as tested in step 567, the next sector is processed in steps 562-565. If the zone has been fully processed, the zone number is incremented and the zone count is decremented in step 569. If there are no more zones to be counted as found in step 570, the procedure is terminated in step 572. Otherwise, the next zone is processed.

The discussion for prior figures and illustrations has shown how normal operations on the word processing system 10 may proceed when more than one zone may be encountered on a storage volume. However, a method is also needed for the system to create multiple zones. The storage access method operation for multiple zones is called Format Zone Partition. In the word processing system 10, only the last zone may be partitioned.

Figure 12A:
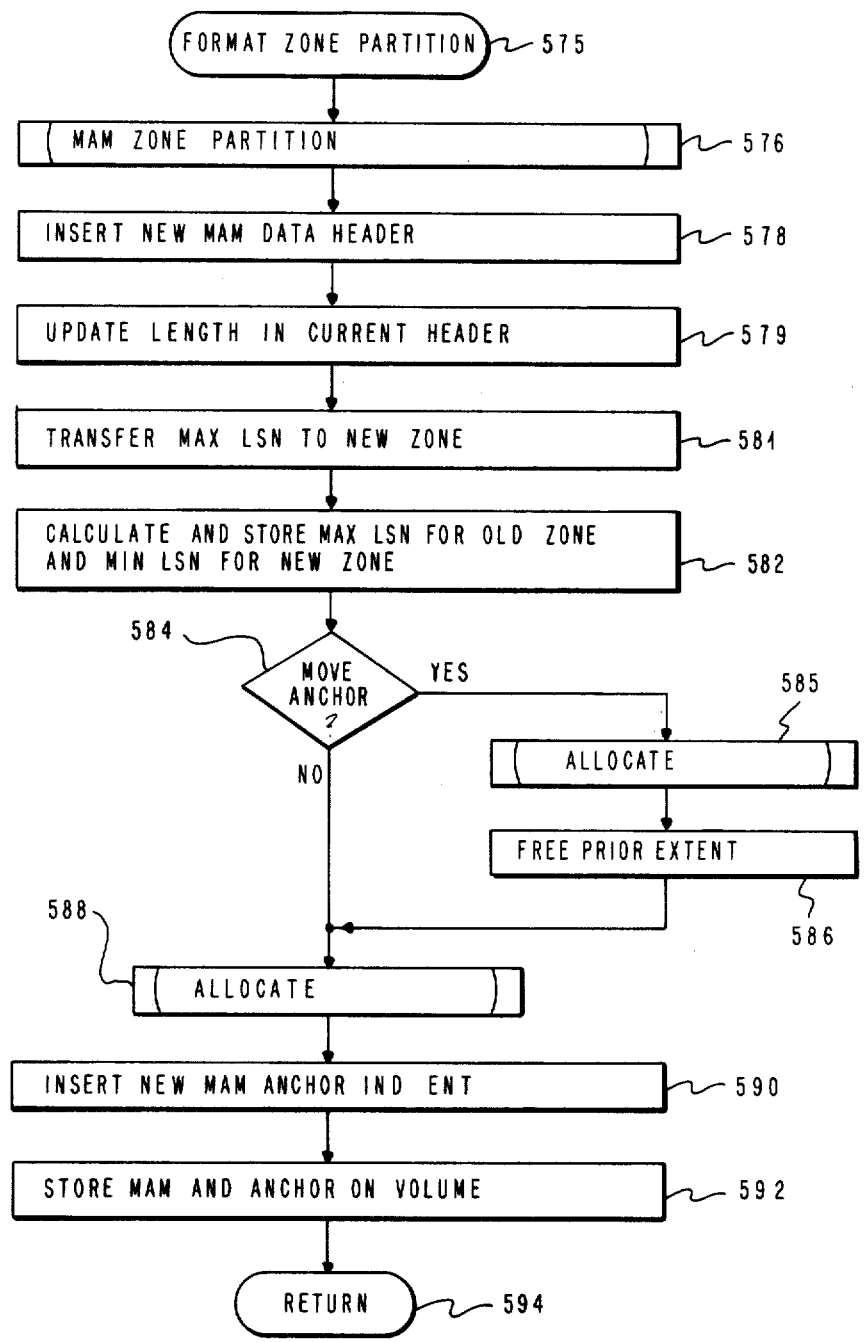
FIGS. 12A-D are flow diagrams and examples of the media allocation map buffer contents illustrating the operational steps of the present invention with respect to Format and the creation of a new volume zone.

A logical operation of the present invention with respect to Format zone partition is illustrated in the flow diagram shown in FIG. 12A. The procedure is started with the format zone partition routine step 575. In step 576, the MAM zone partition procedure is performed to determine where the partition point lies in the media allocation map zone data. The partition point is determined by the zone end logical sector 409 of SECB 400 (FIG. 7). The MAM zone partition routine provides the location of the zone variable information 312 in UCS 300 for the zone being partitioned, the location of the media map data in the media allocation map data buffer 314, the offset within the map data to the partition point, and the number of sectors in the proposed new zone.

Using the MAM data pointer and partition point offset, a new MAM data header is inserted in step 578 in the MAM data at the partition point to create a new zone media allocation map, and in step 579 the length of the old map data is adjusted to reflect the fact that the allocation groups in the new zone no longer belong to the old zone. In step 581 the max LSN for the current zone 327 is transferred to the zone variable information for the new zone. This is because the same total sectors still exist, but the old high LSN is now the high LSN for the new zone. From the sector count in the new zone, the zone minimum LSN 326 for the new zone and the resulting zone maximum LSN for the current zone are calculated and stored in step 582.

In order to allow the keystroke service routines to manage anchor update performance on the volume, an option is provided to leave the anchor where it now is or to move it to the new zone. If in step 584 the anchor is to be moved, the allocate procedure is performed in step 585 to allocate a sector for the anchor in the new zone, and the current anchor allocation in some other zone is freed in step 586.

The media allocation map for the new zone is allocated by performing the allocate procedure in step 588. The new index entry for the new media allocation map is then inserted in the anchor in step 590, and the media allocation map and anchor are written to the storage volume at the designated logical sectors. Finally, the procedure is terminated at step 594 until the next request for format zone partition is received.

Figure 12B:
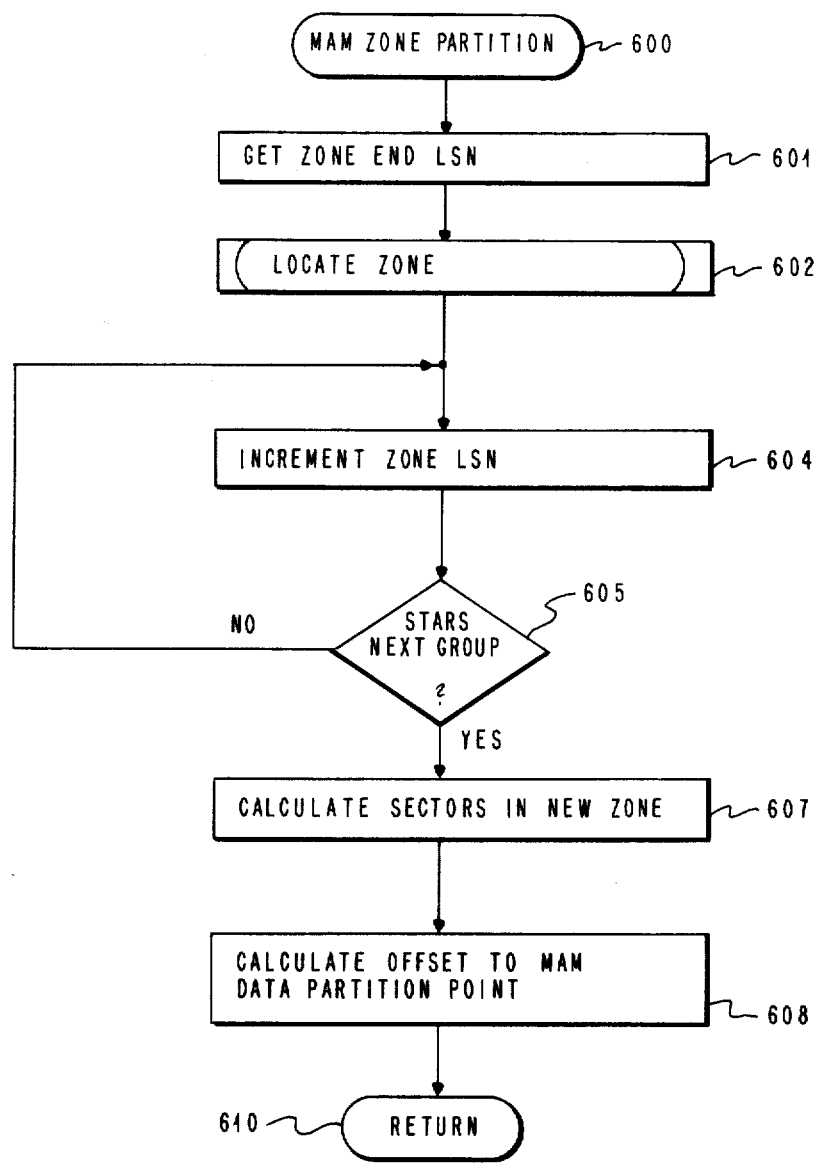

A logical operation of the present invention with respect to MAM zone partition is illustrated in the flow diagram shown in FIG. 12B. The procedure is started with the MAM zone partition routine step 600. In step 601, the zone ending LSN is fetched so that it can be used in step 602 in the locate zone procedure to locate the proper zone.

Next, the logical sector number and location corresponding to the start of the next allocation group map in the media allocation map data are found in steps 604 and 605. From this information and the zone maximum LSN 327 in zone variable information 312, the number of sectors in the new zone may be calculated in step 607. After obtaining the offset to the start of the first allocation group for the new zone in the zone MAM data in step 608, the procedure is terminated in step 610 until the next request for MAM zone partition is detected.

Figure 12C:
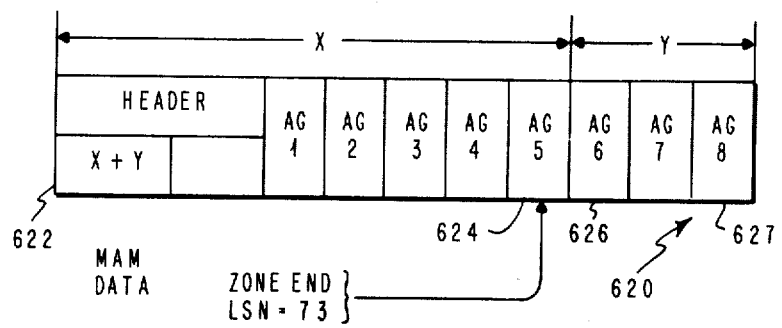
Figure 12C:
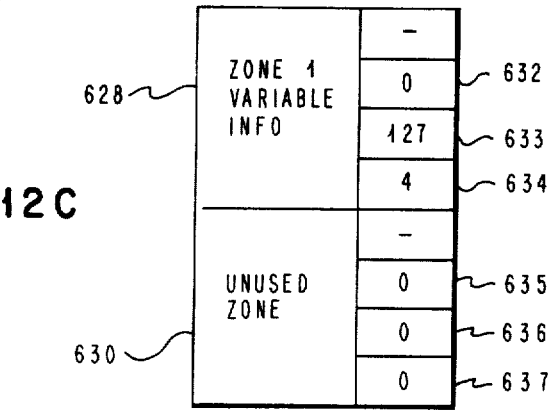
Figure 12D:
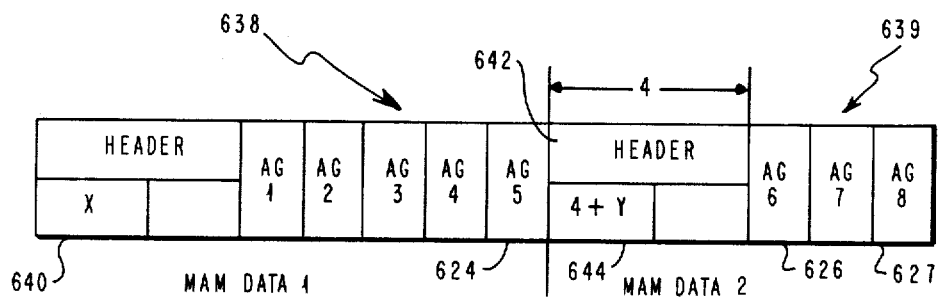
Figure 12D:
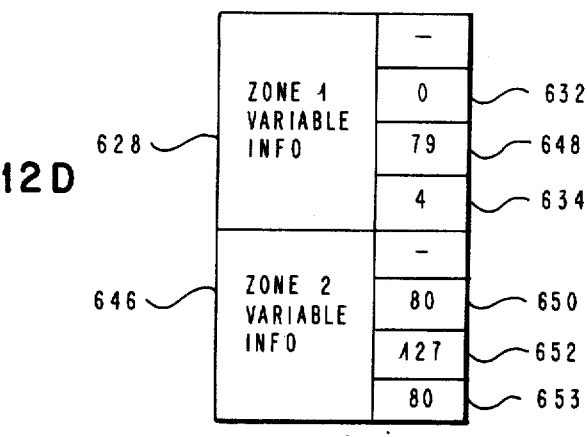

FIGS. 12C and 12D show block diagrams illustrating an example of the zone partition procedures described above. MAM data 620 consists of 8 allocation groups, AG1-AG8. Header length 622 contains the total length of MAM data 620. Zone variable information area 628 describes the current zone. Assuming 16 sectors per cylinder (allocation group), the zone minimum LSN 632 is 0 and the zone maximum LSN 633 is 127. Zone map allocation LSN 634 shows the current zone MAM data as being allocated within its zone.

It is further assumed for this example that a keystroke processor routine 34 has determined that the current zone should be partitioned at the end of the cylinder containing logical sector number 73. The allocation data for logical sector 73 lies in allocation group 5 (624). Allocation group 6 (626) is thus the first allocation group which should be in the new zone.

After the zone partition operation, the resulting state is illustrated in the block diagram in FIG. 12D. MAM data 620 has been partitioned into MAM data 1 (638) and MAM data 2 (639). The length 640 for MAM data 1 has been altered to include only the first 5 allocation groups. A header 642 has been inserted in front of allocation group 6 (626). The length 644 of MAM data 2 (639) is set to the length of the last three allocation groups plus the length of the header itself.

In the zone variable information diagram, zone 1 variable information 628 has been updated so that zone 1 maximum LSN 648 contains the LSN of the last sector in allocation group 5 (624). Zone 2 variable information area 646 has been initialized so that zone minimum LSN 650 is equal to the LSN of the first sector in allocation group 6 (626). The zone maximum LSN 652 is still equal to the LSN of the last sector in allocation group 8 (627). The zone 2 map allocation LSN 653 reflects the fact that the MAM data 2 (639) for zone 2 was stored in the first available sector in the zone.

The operations necessary to recover the data and data set indexes on a volume are the subject of a related patent application entitled "Volume Recovery Method". The extension of these operations to include volume zoning is the heart of the present invention.

Figure 13:
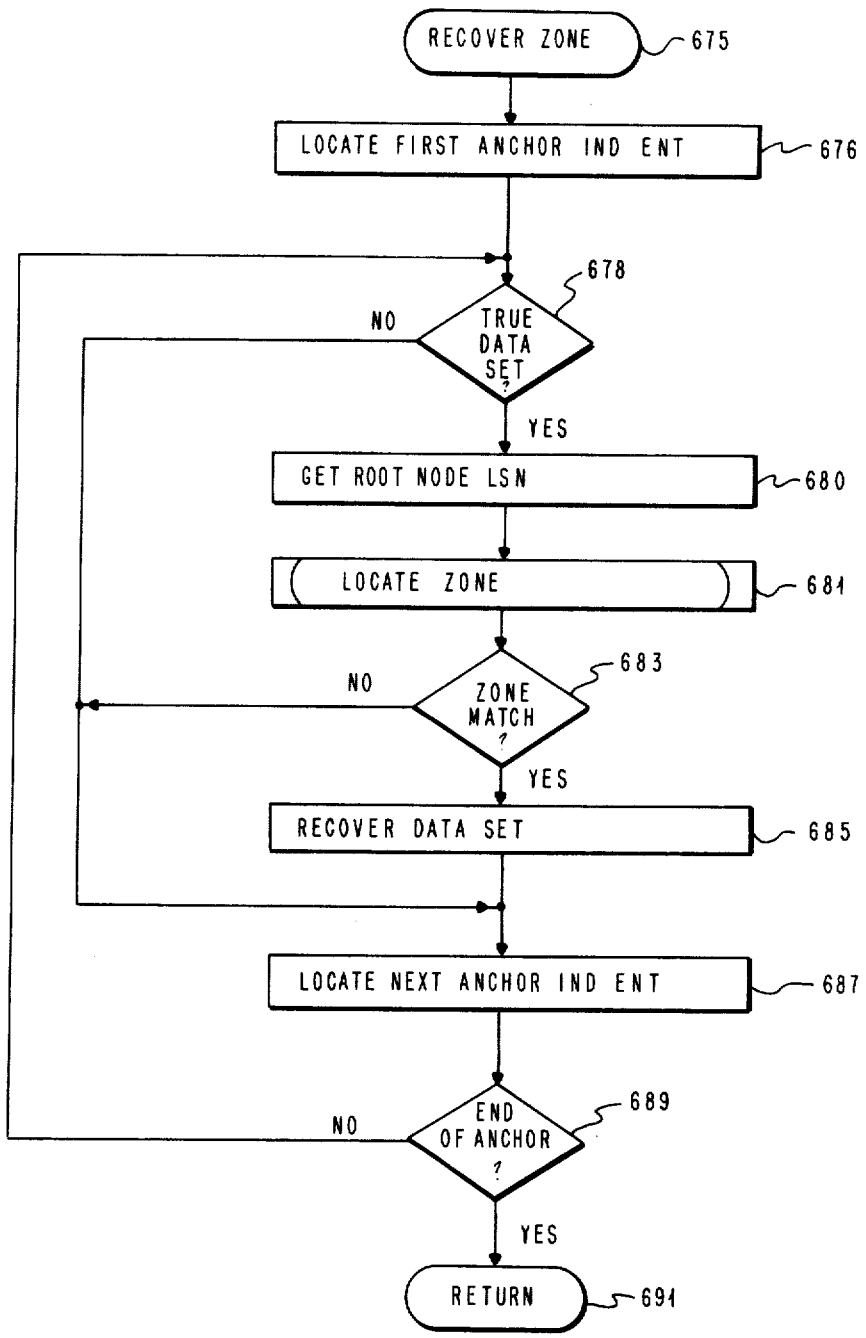
FIG. 13 is a flow diagram showing the operational steps of the present invention with respect to Recover volume and volume zones.

A logical operation of the present invention with respect to Recover zone is illustrated in the flow diagram shown in FIG. 13. The procedure is started with the recover zone routine step 675. In step 676, the first index entry in the anchor is located as initialization. If the current index entry is found in step 678 to be a data set which is subject to recovery, the root node logical sector number is fetched in step 680, and the locate zone procedure is performed in step 681 to determine the zone of the data set. If the zone matches the desired zone in step 683, the data set is recovered using the data set recovery methods for word processing system 10. Note that the anchor and the media allocation map(s) have index entries in the anchor, but these items are not recovered using standard data set recovery operations in step 685. In the case of the anchor, the recover zone procedure is the recovery operation.

After processing a data set index entry in the anchor, the next anchor index entry is located in step 687. If the end of the anchor has not been detected in step 698, the next entry is processed as above. Otherwise, the procedure is terminated in step 691 until the next request for recover zone is issued.

In summary, the present invention provides a method and apparatus for partitioning a storage volume into logically independent portions called zones, for managing subsequent media allocations so as to keep the zones logically independent of each other, for providing volume information and statistics on the basis of the entire volume or a single zone, and for limiting the scope of volume recovery to a single zone in order to improve performance.

Although several embodiments of the invention have been illustrated in the accompanying drawing and described in the foregoing detailed description, it will be understood that the invention is not limited to the embodiments disclosed but is capable of numerous rearrangements, modifications and substitutions without departing from the scope of the invention.

What is claimed is:

1. In a word processing system where a text stream is stored on a direct access storage device and where said text may be selected later for revision, a method for detecting errors in data sets and volume indexes on a storage volume which require recovery before normal access may proceed, said method comprising the steps of:

partitioning said storage volume into a plurality of zones;

opening a data set on one of said plurality of zones for read/write access;

closing said data set on said one of said plurality of zones for read/write access; and recovering each of said plurality of zones by treating each of said plurality of said zones as an independent storage volume.

2. A method according to claim 1 wherein the step of partitioning said storage volume comprises the steps of:

partitioning a media allocation map zone to determine where a partition point lies in media allocation map zone data;

inserting a new media allocation map data header at said partition point to create a new zone media allocation map;

updating the length of said media allocation map data;

transferring a maximum logical sector number for said new zone media allocation map to zone variable information for said new zone media allocation map;

calculating and storing a maximum logical sector number for a previous zone and a minimum logical sector number for said new zone;

allocating a sector for media allocation map in said new zone;

inserting a new index entry for said new media allocation map in said zone; and writing said media allocation map into said storage volume at the allocated logical sector.

3. A method according to claim 2 wherein the step of partitioning a media allocation map zone comprises the steps of:

fetching a zone ending logical sector number;

locating a zone;

finding a logical sector number and a location corresponding to the start of the next allocation group media allocation map;

calculating the number of logical sectors in said new zone; and calculating an offset to the start of the first allocation group for said new zone in said zone media allocation map data.

4. A method according to claim 2 wherein said allocating step comprises the steps of:

locating a zone;

checking the availability of an extent at a current logical sector number;

marking the extent of said current logical sector number as no longer available subsequent to the determination of extent availability; and signalling a successful extent allocation and terminating said allocate procedure.

5. A method according to claim 1 wherein the step of opening a data set comprises the steps of:
- searching the anchor and directory of said storage volume for the existence of a requested data set;
- obtaining a data set root logical sector number and performing a locate zone procedure subsequent to the determination that a requested data set is in existence;
- re-searching said anchor subsequent to the determination that said requested data set is not in existence to determine the existence of a data set of the same type as said requested data set;
- fetching the root node from a data set of the same type subsequent to the determination of the existence of such data set of the same type;
- locating a zone;
- creating a new data set and opening said new data set for read/write access;
- storing a copy of a new root node in a storage access control block;
- adding said storage access control block to a chain of storage access control blocks; and
- setting a zone recovery flag in said storage access control block.

6. A method according to claim 5 wherein the step of closing a data set comprises the steps of:
- performing data set level operations to close access;
- removing said storage access control block from said storage access control block chain;
- fetching a storage access control block chain pointer; and
- resetting said zone recovery flag.

7. A method according to claim 1 wherein said recovering step comprises the steps of:
- locating a first anchor index entry;
- determining that said first anchor index entry is a true data set;
- fetching the root node logical sector number of said first anchor index entry;
- locating a zone;
- determining that a located zone matches a desired zone;
- recovering a data set;
- locating a next anchor index entry; and
- terminating said recovery zone procedure upon determination that the end of the anchor has been detected.

8. A method according to claim 1 further comprising the step of accessing said storage volume to obtain volume statistical information.

9. A method according to claim 8 wherein said storage accessing step comprises the steps of:
- locating a first anchor index entry;
- initializing the statistics of said first anchor index entry to zero;
- fetching a logical sector number for said first anchor index entry;
- locating the zone of said first anchor index entry;
- determining whether or not to include said first anchor index entry in a data set counts;
- including said first anchor index entry in said data set counts subsequent to the determination that a plurality of zones have been specified;
- locating the next anchor index entry;
- determining that the end of the anchor has been reached; and
- performing a media allocation map statistics procedure.

10. A method according to claim 9 wherein the step of performing a media allocation map statistics procedure comprises the steps of:
- initializing total sector counts and available sector counts to zero;
- setting a zone count to "1" upon determination that only a specific zone is to be considered;
- setting a current zone logical sector number to the initial logical sector number for said zone thereby starting processing of said zone;
- fetching the status of said logical sector;
- incrementing total sector count and a current zone logical sector number;
- incrementing the number of said zone and decrementing the count of said zone subsequent to the determination that said zone has been fully processed; and
- terminating said media allocation map statistics procedure upon determination that the last zone has been counted.

11. A method according to claims 3, 4, 5, 7 or 9 wherein the locate zone step comprises the steps of:
- accessing zone variable information; and
- determining the location in a unit control block storage of requested zone media allocation map data.

* * * * *